(12) United States Patent
Suzuki

(10) Patent No.: US 10,318,054 B2
(45) Date of Patent: Jun. 11, 2019

(54) DISPLAY DEVICE AND DISPLAY METHOD

(71) Applicant: Japan Display Inc., Tokyo (JP)

(72) Inventor: Takafumi Suzuki, Tokyo (JP)

(73) Assignee: Japan Display Inc., Tokyo (JP)

(*) Notice: Subject to any disclaimer, the term of this patent is extended or adjusted under 35 U.S.C. 154(b) by 91 days.

(21) Appl. No.: 15/455,731

(22) Filed: Mar. 10, 2017

(65) Prior Publication Data

US 2017/0269773 A1 Sep. 21, 2017

(30) Foreign Application Priority Data

Mar. 15, 2016 (JP) ................................ 2016-050440

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04105* (2013.01)

(58) Field of Classification Search
CPC .... G06F 3/0412; G06F 3/0414; G06F 3/0416; G06F 3/044
USPC ................................................. 345/173, 174
See application file for complete search history.

(56) References Cited

U.S. PATENT DOCUMENTS

| 2012/0075241 A1* | 3/2012 | Bao ........................ H01L 29/84 345/174 |
| 2016/0103544 A1* | 4/2016 | Filiz ...................... G06F 3/0414 345/174 |
| 2016/0125225 A1* | 5/2016 | Ebihara ................ G06F 3/0414 382/115 |
| 2016/0216833 A1* | 7/2016 | Butler .................. G06F 3/0412 |

FOREIGN PATENT DOCUMENTS

JP 2000-066837 A 3/2000

* cited by examiner

*Primary Examiner* — Calvin C Ma
(74) *Attorney, Agent, or Firm* — K&L Gates LLP

(57) ABSTRACT

A display device includes: a display section having a screen and a first electrode section provided at a first position in a thickness direction; a second electrode section provided at a second position in the thickness direction; a gap section which is provided between the first electrode section and the second electrode section and is deformable in the thickness direction when the screen is pressed; and a circuit section which is connected to the first electrode section and the second electrode section, displays to the screen, and detects a press onto the screen, and a capacitance value of a first capacitance between the first electrode section and the second electrode section is changeable due to deformation of the gap section. In a force period, the circuit section applies a sensor driving signal to the second electrode section, and detects a sensor detection signal based on the sensor driving signal through the first capacitance.

19 Claims, 28 Drawing Sheets

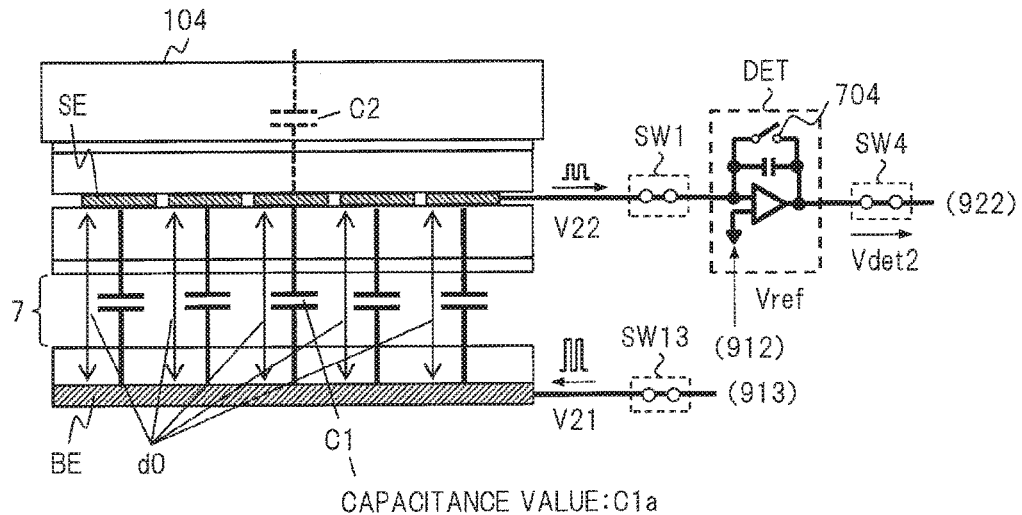
FIG. 15
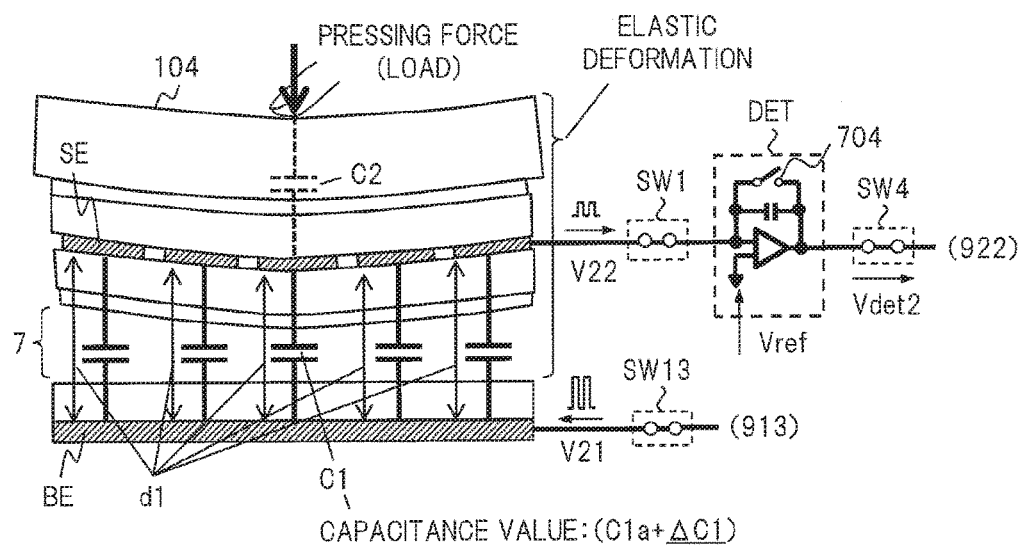

SECOND EMBODIMENT

FIRST MODIFICATION EXAMPLE

FOURTH MODIFICATION EXAMPLE

SIXTH MODIFICATION EXAMPLE

COMPARATIVE EXAMPLE

DISPLAY DEVICE AND DISPLAY METHOD

CROSS-REFERENCE TO RELATED APPLICATIONS

The present application claims priority from Japanese Patent Application No. 2016-050440 filed on Mar. 15, 2016, the content of which is hereby incorporated by reference into this application.

TECHNICAL FIELD OF THE INVENTION

The present invention relates to a display device, and relates to a technique effectively applied to a display device having a touch sensing function and a force sensing function.

BACKGROUND OF THE INVENTION

A display device such as a liquid crystal display and electronic equipment provided with a display device include a touch sensing device (which may be hereinafter referred to as "touch sensor") and a force sensing device (which may be hereinafter referred to as "force sensor") as input devices in some cases.

A capacitance touch sensing device senses proximity and contact (which may be hereinafter generically referred to as "touch") of an object such as a finger (which may be hereinafter referred to as a "finger") serving as a dielectric body to a screen of a display device based on a change in capacitance. The display device uses sensing information such as coordinates of touch position output by the touch sensing device as input information A capacitance force sensing device senses a pressing force onto a screen of a display device based on a change in capacitance. Specifically, the force sensing device detects a change amount of capacitance based on elastic deformation by press, and calculates the pressing force based on the change amount. The display device uses sensing information such as the pressing force output by the force sensing device as input information.

For example, Japanese Patent Application Laid-Open No. 2000-66837 (Patent Document 1) describes a pressure sensing mechanism for sensing a pressure onto a liquid crystal display element based on a change in capacitance occurring when a liquid crystal display cell is pressed to be deformed.

SUMMARY OF THE INVENTION

There is a capacitive display device having a touch sensing function and a force sensing function. As this type of display device, a display device, which simultaneously performs touch sensing and force sensing based on a change in capacitance between a finger and a sensor electrode, has been known.

However, detection signals from the sensor electrode in the display device include both a first voltage signal representing a capacitance value corresponding to a pressed state of a screen and a second voltage signal representing a capacitance value corresponding to a touch position on the screen. In this display device, it is difficult to detect the first voltage signal and the second voltage signal separately from the detection signals, and respective detection results of both force sensing and touch sensing may become vague. Namely, in this display device, there is room for improvement in terms of force sensing accuracy or touch sensing accuracy.

An object of the present invention is to provide a technique capable of improving force sensing accuracy or touch sensing accuracy for a display device.

Typical embodiments of the present invention each provide a display device and a display method and have the following configuration.

A display device of one embodiment includes: a display section including a screen and a first electrode section which is provided at a first position in a thickness direction intersecting the screen so as to face the screen; a second electrode section which is provided at a second position farther away from the screen than the first electrode section in the thickness direction so as to face the first electrode section and face the screen through the first electrode section; a gap section which is provided between the first electrode section and the second electrode section and is deformable in the thickness direction when the screen is pressed; and a circuit section which is connected to the first electrode section and the second electrode section, displays to the screen, and detects a press onto the screen, a capacitance value of a first capacitance between the first electrode section and the second electrode section is changeable due to deformation of the gap section, and the circuit section applies a sensor driving signal to the second electrode section, and detects a sensor detection signal based on the sensor driving signal through the first capacitance.

A display method of one embodiment is a display method for performing force sensing and touch sensing on a screen of a display device, a time-division period includes a touch period in which the touch sensing is performed and a force period in which the force sensing is performed, the display device includes: a display section including a screen and a first electrode section which is provided at a first position in a thickness direction intersecting the screen so as to face the screen; a second electrode section which is provided at a second position farther away from the screen than the first electrode section in the thickness direction so as to face the first electrode section and face the screen through the first electrode section; a gap section which is provided between the first electrode section and the second electrode section and is deformable in the thickness direction when the screen is pressed; and a circuit section which is connected to the first electrode section and the second electrode section, displays to the screen, and detects a press onto the screen, a capacitance value of a first capacitance between the first electrode section and the second electrode section is changeable due to deformation of the gap section, and steps for controlling the first electrode section and the second electrode section by the circuit section includes: a first step in which the circuit section applies a sensor driving signal to the second electrode section, and detects a sensor detection signal based on the sensor driving signal through the first capacitance; and a second step in which the circuit section applies a touch driving signal to the first electrode section, detects a change of a second capacitance between the first electrode section and an external object touching the screen, calculates presence or absence of the touch and coordinates of a touch position corresponding to a state of the touch based on the change of the second capacitance, and outputs a touch sensing signal including the presence or absence of the touch and the coordinates of the touch position.

BRIEF DESCRIPTIONS OF THE DRAWINGS

FIG. 15 illustrates a state of absence of finger press for mutual capacitance force sensing in the force period in the display device according to the first embodiment;

FIG. 16 illustrates a state of presence of finger press for mutual capacitance force sensing in the force period in the display device according to the first embodiment;

DESCRIPTIONS OF THE PREFERRED EMBODIMENTS

Figure 1:
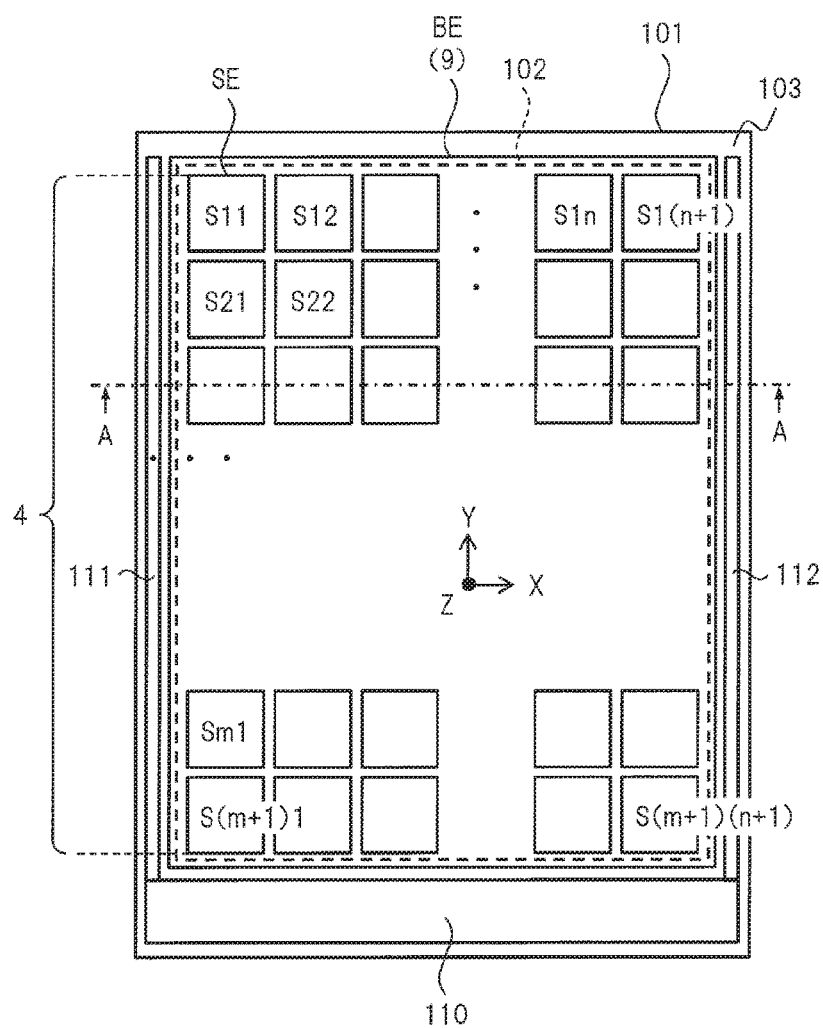
FIG. 1 illustrates a configuration of a main plane in a display device according to a first embodiment of the present invention.

Embodiments of the present invention will be described below with reference to the drawings. Note that disclosure is only one example and appropriate changes to be easily conceived by those skilled in the art without departing from the spirit of the present invention are naturally included in the scope of the present invention. The width, the thickness, the shape, and the like of each of sections may be more schematically illustrated in the drawings compared with those in actual aspects to make the description more clear, but they are only one example and are not intended to limit the interpretation of the present invention. Elements similar to those which have been already described with reference to the previous drawings may be assigned with the same reference characters in the present specification and each of the drawings, and detailed descriptions thereof may be omitted. To make the drawings easier to understand, even when a plurality of similar elements exist, only some of the elements may be assigned with reference characters, or hatching in a cross section may be omitted.

First Embodiment

A display device and a display method according to a first embodiment of the present invention will be described with reference to FIGS. 1 to 18. The display device according to the first embodiment is an in-cell touch type liquid crystal display, in which components of a force sensor and a touch sensor are incorporated into a display section having a liquid crystal display function. The display device according to the first embodiment includes a mutual capacitance force sensor. The force sensor detects a change in capacitance corresponding to a pressed state of a screen and detects the pressed state of the screen based on the change in capacitance. The display device according to the first embodiment includes a self capacitance touch sensor. The touch sensor detects a change in capacitance corresponding to a touched state of a screen and detects coordinates of touch position or the like based on the change in capacitance.

In the present embodiment, "force sensing" means the detection whether a screen is pressed enough to be bent with the finger of a user or an object such as a stylus. Further, in the present embodiment, "force sensing" includes not only the detection of the presence or absence of press but also the detection of the degree of press.

The display method according to the first embodiment is a method including steps executed by the display device according to the first embodiment, and includes a step of performing force sensing and a step of performing touch sensing.

Directions in the following description include an X-direction serving as a first direction, a Y-direction serving as a second direction, and a Z-direction serving as a third direction. The X-direction and the Y-direction are two directions intersecting each other within a plane when a screen of the display device is seen in a plan view. In the first embodiment, the X-direction is a horizontal direction within the screen, and the Y-direction is a perpendicular direction within the screen. The Z-direction is a direction vertical to the screen, and is also referred to as a thickness direction of the display section.

[Comparative Example]

Some additional descriptions will be provided for the problems mentioned above. Thus, a display device and a display method in a comparative example of the first embodiment will be described.

Figure 28:
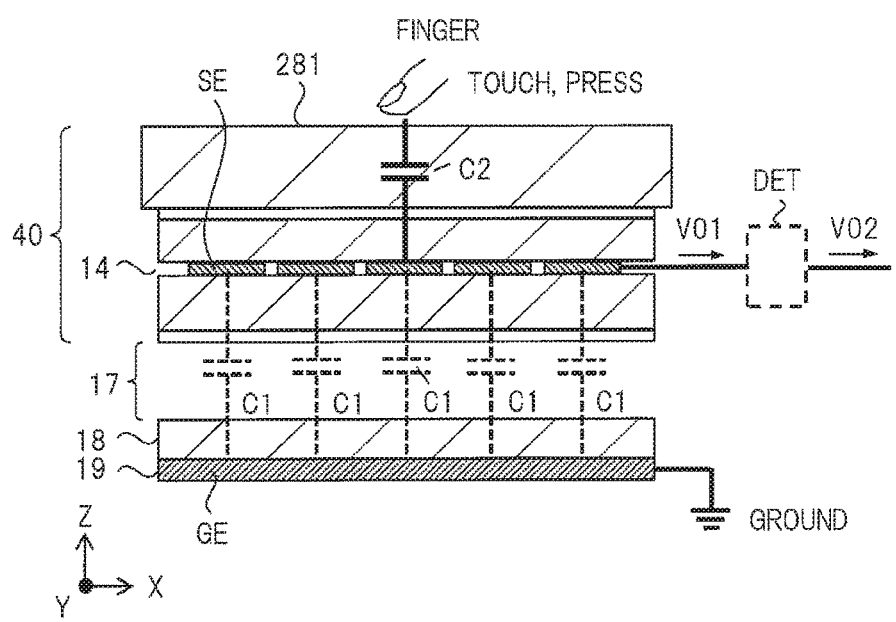
FIG. 28 illustrates a configuration of a cross section of a display device in a comparative example.

FIG. 28 illustrates a configuration of a cross section of a main body section in the display device in the comparative example. The display device in the comparative example has a self capacitance force sensing function and touch sensing function. The display device includes a sensor electrode section 14 provided in a display section 40 and a ground electrode section 19 provided on a side opposite to a screen with respect to the sensor electrode section 14 in the display section 40. The ground electrode section 19 is provided at a position spaced apart from a position of the sensor electrode section 14 in the Z-direction with a gap section 17 and a backlight section 18 interposed therebetween.

In the sensor electrode section 14, a plurality of sensor electrodes SE are arranged in a matrix on an X-Y plane. The sensor electrodes SE are used for display, force sensing, and touch sensing. The ground electrode section 19 has a ground electrode GE which is grounded to have a ground potential. The ground electrode GE is provided in a planar shape to correspond to a surface of the sensor electrode section 14 in the X-Y plane.

The display method in the comparative example is a method for simultaneously performing self capacitance force sensing and touch sensing using the sensor electrode section 14 and the ground electrode section 19.

A user touches and presses a surface 281 of a cover member covering the screen of the display section 40. A first capacitance C1 is indicated as a capacitance between the sensor electrode SE and the ground electrode GE. A second capacitance C2 is indicated as a capacitance between the finger of the user, a stylus pen or the like (sensed object) and the sensor electrode SE. The first capacitance C1 has a capacitance value corresponding to a distance in the Z-direction between the sensor electrode SE and the ground electrode GE. The second capacitance C2 has a capacitance value formed between the sensor electrode SE and the sensed object.

The display device includes a plurality of detectors DET in a circuit section connected to the display section 40. The detector DET is connected to the sensor electrode SE. When force sensing and touch sensing are performed, the detector DET receives an input of a voltage signal V01 from the sensor electrode SE. The voltage signal V01 has a voltage value representing a capacitance value on which both the capacitance value of the first capacitance C1 and the capacitance value of the second capacitance C2 are reflected. The detector DET outputs the voltage signal as a detection signal V02. A detection circuit including the detector DET detects a capacitance difference value corresponding to a change in capacitance of the first capacitance C1 and the second capacitance C2 as a voltage difference value based on the detection signal V02. The detection circuit performs the touch sensing and the force sensing based on the voltage difference value.

In the display device and the display method, the sensor electrode SE is shared in the touch sensing and the force sensing, and the self capacitance touch sensing and force sensing are simultaneously performed. Thus, in the detection circuit including the detector DET, both a first voltage signal corresponding to a change in the first capacitance C1 associated with the force sensing and a second voltage signal corresponding to a change in the second capacitance C2 associated with the touch sensing are simultaneously detected. In other words, in the detection circuit, one voltage signal including respective components of the first voltage signal corresponding to the first capacitance C1 and the second voltage signal corresponding to the second capacitance C2 is detected as the detection signal.

In the comparative example, even when only the force sensing is desired to be performed, the detection signal including not only the component relating to the first capacitance C1 but also the component relating to the second capacitance C2 is detected. In addition, even when only the touch sensing is desired to be performed, the detection signal including not only the component relating to the second capacitance C2 but also the component relating to the first capacitance C1 is detected. Thus, in the comparative example, it is difficult to detect only a required signal such as the first voltage signal or the second voltage signal separately from the detection signal.

Figure 29:
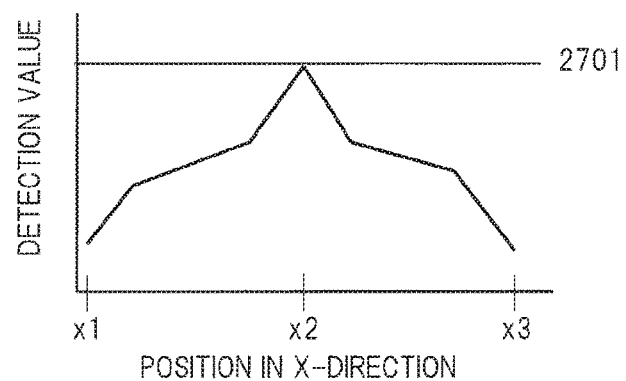
FIG. 29 illustrates a waveform of a detection signal in the display device in the comparative example.

FIG. 29 illustrates a waveform of the detection signal associated with the self capacitance touch sensing and force sensing in the display device in the comparative example In FIG. 29, a horizontal axis represents a position in a screen in an X-direction, and a vertical axis represents a detection value of the detection signal in the detection circuit. Examples of the position in the X-direction include x1, x2, and x3. In this case, x2 represents a position in the vicinity of the center of the screen, and x1 and x3 respectively represent positions in the vicinities of left and right ends of the screen. This detection value represents a voltage difference value corresponding to a capacitance difference value. The waveform of the detection signal illustrated in FIG. 29 includes respective components of both a force signal and a finger signal. The force signal is the first voltage signal associated with the force sensing and is the voltage signal corresponding to the capacitance difference value of the first capacitance C1. The finger signal is the second voltage signal associated with the touch sensing and is the voltage signal corresponding to the capacitance difference value of the second capacitance C2.

The detection signal includes the respective components of both the force signal and the finger signal. Thus, in the detection circuit, it is difficult to separately detect the force signal and the finger signal accurately from the detection signal. For example, the detection value is a peak value 2701 at the position x2. However, it is difficult to accurately separate the finger signal and the force signal because respective magnitudes of the component of the finger signal and the component of the force signal in the detection value are not clear. Thus, in the detection circuit, it is difficult to accurately calculate and measure a pressing force or the like based on the force signal in the detection signal. Further, in the detection circuit, it is difficult to accurately calculate and measure coordinates of touch position or the like based on the finger signal in the detection signal. Namely, in the comparative example, there is room for improvement in terms of both force sensing accuracy and touch sensing accuracy.

Figure 30:
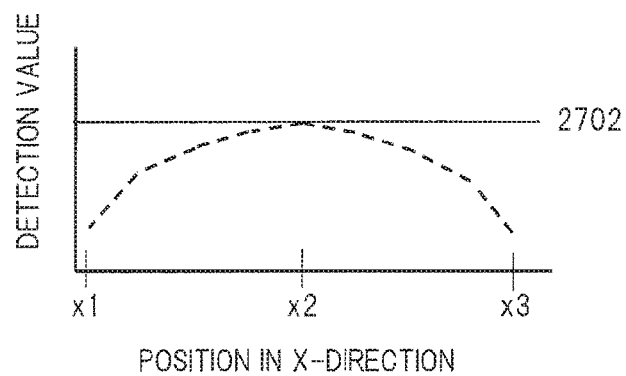
FIG. 30 illustrates a waveform of a force signal ideally separated from the detection signal in the display device in the comparative example.

FIG. 30 illustrates only the component of the force signal ideally separated from the detection signal illustrated in FIG. 29. If such a waveform is obtained, for example, a peak value 2702 at the position x2 is accurately found. Accordingly, the detection circuit can more accurately calculate the pressing force by using the peak value 2702. In the comparative example, the accurate separate detection of the force signal like this is difficult.

Figure 31:
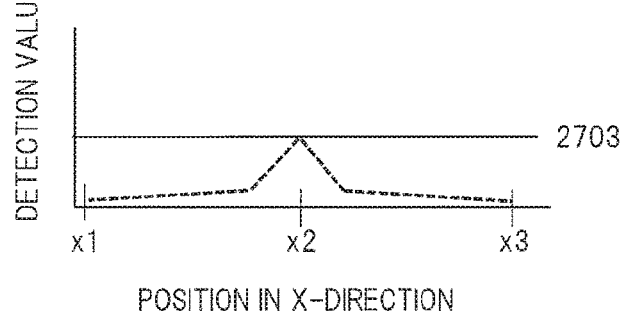
FIG. 31 illustrates a waveform of a finger signal ideally separated from the detection signal in the display device in the comparative example.

FIG. 31 illustrates only the component of the finger signal ideally separated from the detection signal illustrated in FIG. 29. If such a waveform is obtained, for example, a peak value 2703 at the position x2 is accurately found. Accordingly, the detection circuit can more accurately calculate the coordinates of touch position or the like by using the peak value 2703. In the comparative example, the accurate separate detection of the finger signal like this is difficult.

Figure 32:
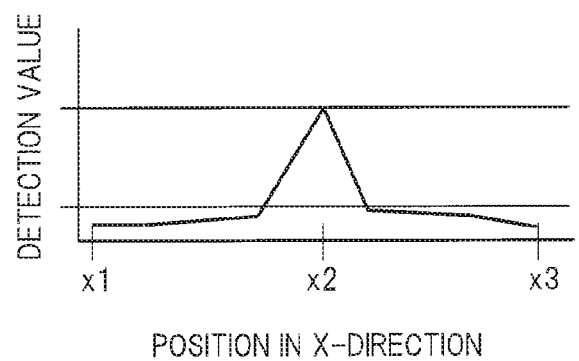
FIG. 32 illustrates a case where a pressing force is small as a waveform of a detection signal corresponding to the pressing force in the display device in the comparative example.
Figure 33:
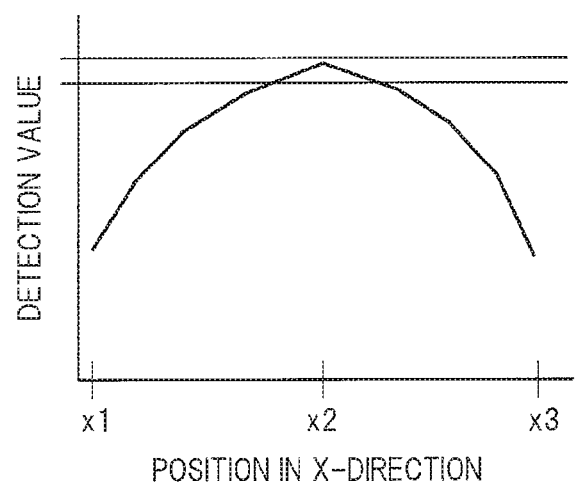
FIG. 33 illustrates a case where a pressing force is large as a waveform of a detection signal corresponding to the pressing force in the display device in the comparative example.

FIGS. 32 and 33 respectively illustrate examples of waveforms of the detection signals depending on magnitude of a pressing force onto the screen with the finger for describing the problem more specifically. FIG. 29 described above illustrates a waveform in the case where the pressing force is relatively medium. This detection signal includes a finger signal and a force signal having a medium value.

FIG. 32 illustrates a case where the pressing force is relatively small. This detection signal includes a finger signal and a force signal having a small value, and is composed mainly of a component of the finger signal. In the waveform of the detection signal, a component of the force signal is buried. In the detection signal, the finger signal is easily detected, but the force signal is not easily detected. Thus, it is difficult to obtain an accurate pressing force or the like.

FIG. 33 illustrates a case where the pressing force is relatively large. This detection signal includes a finger signal and a force signal having a large value, and is composed mainly of a component of the force signal. In the waveform of the detection signal, a component of the finger signal is buried. In the detection signal, the force signal is easily detected, but the finger signal is not easily detected. Thus, it is difficult to obtain accurate coordinates of touch position or the like.

[Display Device_Planar Configuration]

FIG. 1 illustrates a configuration of an X-Y plane when a housing 101 and a screen 102 are seen in a plan view from the Z-direction as a configuration of a main plane of the display device according to the first embodiment. FIG. 1 illustrates a schematic configuration including main electrodes and circuit sections. The housing 101 in the display device has a substantially plate shape, and has a substantially rectangular shape in the X-Y plane. The X-Y plane of the housing 101 includes a section constituting the screen 102 and a frame section 103 including the four sides around the screen 102.

An electrode section including a sensor electrode section 4 and a base electrode section 9 is arranged in the Z-direction to correspond to a region of the screen 102. The sensor electrode section 4 includes a plurality of sensor electrodes SE, and the plurality of sensor electrodes SE are arranged in a matrix. The base electrode section 9 includes at least a base electrode BE assuming at least a planar shape of almost the same size as that of the screen 102.

In the frame section 103, a circuit section 110 is provided in a region in the vicinity of the lower side of the housing 101. A circuit section 111 is provided in a region in the vicinity of the left side of the housing 101. A circuit section 112 is provided in a region in the vicinity of the right side of the housing 101. The circuit section 110 is electrically connected to the circuit section 111 and the circuit section 112. The circuit section 110 includes an IC (Integrated Circuit) chip and a signal line, for example. Each of the circuit sections 111 and 112 includes a scanning circuit (gate driver 121 described below), for example.

The sensor electrode section 4 is a first electrode section. The sensor electrode SE is a first electrode. The sensor electrode SE in the sensor electrode section 4 is an electrode section constituting respective functions such as a function as a common electrode for display, a function as an electrode for touch sensing, and a function as a receiving electrode for force sensing (in other words, a sensor detection electrode). The sensor electrode SE is shared among the functions.

While the sensor electrode SE has a square shape in FIG. 1, the present invention is not limited to this. The plurality of sensor electrodes SE in the sensor electrode section 4 are arranged in a matrix in the X-Y plane with a short gap provided between the adjacent sensor electrodes SE in each of the X-direction and the Y-direction.

The base electrode section 9 is a second electrode section. The base electrode BE is a second electrode. The base electrode section 9 is an electrode section mainly constituting a function as a transmission electrode for force sensing (in other words, a sensor driving electrode).

[Main Body Section_Cross-Sectional Configuration]

Figure 2:
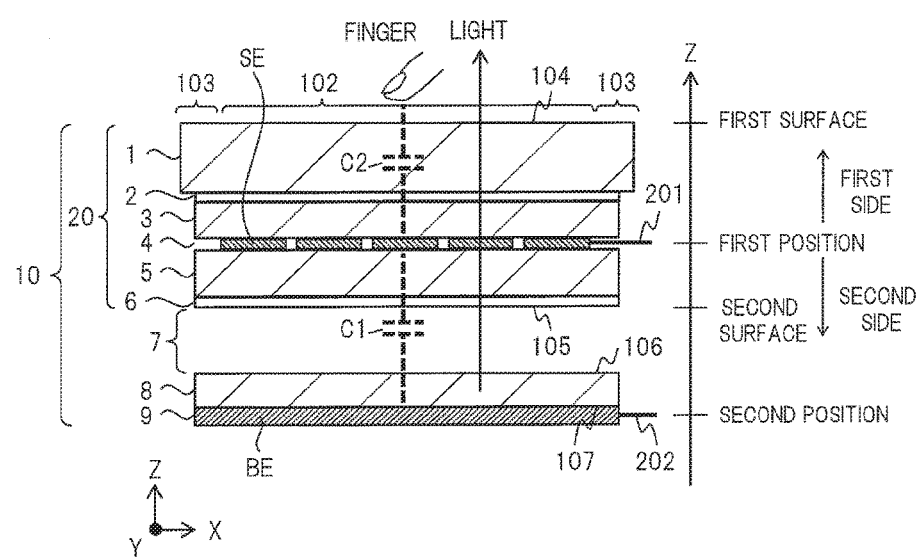
FIG. 2 illustrates a configuration of a cross section of a main body section in the display device according to the first embodiment.

FIG. 2 illustrates a configuration of a cross section of a main body section 10 in the display device according to the first embodiment. The cross section illustrated in FIG. 2 is a cross section in an X-Z plane in the main body section 10 including the sensor electrode section 4 and the like in the display device illustrated in FIG. 1. In the main body section 10 illustrated in FIG. 2, the side of a tip end of an arrow indicating a Z-axis is defined as the upper side, and the side of a base end of the Z-axis is defined as the lower side. Therefore, in the main body section 10, a display section 20 is stacked on the upper side of a backlight section 8.

The main body section 10 includes the display section 20 constituting the screen 102 illustrated in FIG. 1, except the circuit sections 110, 111, and 112 and the housing 101. The main body section 10 includes the screen 102 of the display section 20, the sensor electrode section 4 in the display section 20, a lower surface 105 of the display section 20, a gap section 7, the backlight section 8, and the base electrode section 9 in this order from above in the Z-direction. The main body section 10 is stored in the housing 101. At least the frame section 103 in the main body section 10 is fixed to the housing 101, which fixes the position of the frame section 103 in the Z-direction, and further forms the gap section 7 between the display section 20 and the backlight section 8.

The display section 20 includes a cover glass 1, a second polarizing plate 2, a second substrate 3, a liquid crystal layer, a pixel electrode, the sensor electrode section 4, a first substrate 5, and a first polarizing plate 6 in this order from above in the Z-direction. The display section 20 is a liquid crystal display section implementing a liquid crystal display function for displaying an image and a video on the screen 102, and is an in-cell touch type liquid crystal display section. A main part of the display section 20 is composed of a light transmissive member. The display section 20 has a visible light transmittance of, for example, 80% or more. The display section 20 transmits light from the backlight section 8 so that the light is emitted to an upper surface 104, as indicated by an arrow illustrated in FIG. 2.

For the sake of description, a position where the sensor electrode section 4 of the display section 20 is present in the Z-direction is defined as a first position. The side where the screen 102 and the like are present with respect to the first position is defined as the first side, and the side opposite to the first side is defined as the second side. The upper surface 104 constituting the screen 102 of the display section 20 is defined as a first surface, and the lower surface 105 on the side opposite to the first surface is defined as a second surface. The upper surface 104 is to be touched with a finger. The lower surface 105 corresponds to a lower surface of the first polarizing plate 6 and an upper surface of the gap section 7. The base electrode section 9 is arranged at a second position below the first position. The sensor electrode section 4 is provided at the first position closer to the screen 102 in the Z-direction so as to face the screen 102. The base electrode section 9 is provided at the second position farther away from the screen 102 than the sensor electrode section 4 in the Z-direction so as to face the sensor electrode section 4 and face the screen 102 through the sensor electrode section 4. As the outline of a positional relationship, the screen 102 of the display section 20, the sensor electrode section 4 at the first position, the lower surface 105, the gap section 7, and the base electrode section 9 at the second position are provided in this order from above in the Z-direction.

Further, FIG. 2 illustrates a first capacitance C1 and a second capacitance C2 as the capacitance associated with touch sensing and force sensing. The first capacitance C1 is formed between the sensor electrode SE and the base electrode BE. The second capacitance C2 is formed between the finger (sensed object) and the sensor electrode SE.

The cover glass 1 is provided on the second polarizing plate 2, and covers and protects an upper surface of the second polarizing plate 2. In addition to the cover glass 1, a predetermined optical film or the like may be provided. The cover glass 1 has the upper surface 104.

In the display section 20, the sensor electrode section 4 is provided at the first position in the Z-direction between the first substrate 5 and the second substrate 3. The first substrate 5 is an array substrate, and is constituted of a glass substrate, a resin substrate or the like having a TFT (Thin Film Transistor) element or the like formed therein. The second substrate 3 is a counter substrate arranged to face the first substrate 5, and is constituted of a glass substrate, a resin substrate or the like having a color filter or the like formed therein. The first polarizing plate 6 and the second polarizing plate 2 are layers for controlling a polarization direction of light. A mounting structure of the display section 20 will be described below.

The sensor electrode section 4 needs to transmit light for display, and is thus composed of a light transmissive conductive member. The sensor electrode SE is composed of, for example, ITO (Indium Tin Oxide) or IZO (Indium Zinc Oxide).

The backlight section 8 is an element constituting a liquid crystal display function, and irradiates light toward the display section 20. The backlight section 8 includes, for example, a light source, a plurality of optical films including a light guide plate, and a case covering the optical films. The light guide plate guides light from the light source in a direction of the X-Y plane, and emits the guided light upward in the Z-direction. The light emitted upward in the Z-direction from the backlight section 8 is incident on the display section 20 through the gap section 7. A polarization direction of the light incident on the display section 20 is controlled by the first polarizing plate 6, the transmittance of the light is controlled by the liquid crystal layer in the display section 20, and the polarization direction of the light is further controlled by the second polarizing plate 2. The controlled light is emitted from the upper surface 104 corresponding to the screen 102.

The gap section 7 is an air gap, in other words, a hollow layer, and is an element constituting an elastic deformation layer. The gap section 7 is present between the lower surface 105 of the display section 20 and an upper surface 106 of the backlight section 8. The gap section 7 substantially contains only air, and has a significantly lower modulus of elasticity than the modulus of elasticity of the display section 20 in the present embodiment. Therefore, when the screen 102 is pressed with the sensed object, the screen 102 slightly sinks due to the press, so that the display section 20 is bent (elastically deformed). A distance of the gap section 7 in the Z-direction is narrowed by the amount of the bending.

When a pressed state of the screen with the sensed object is resolved, the display section 20 returns to an original planar shape by its own elastic restoration force.

The base electrode section 9 is arranged at the second position on the second side with respect to the first position at which the sensor electrode section 4 is provided in the Z-direction. The base electrode section 9 is spaced apart from the sensor electrode SE by a predetermined distance in the Z-direction and arranged so as to face the sensor electrode SE in the X-Y plane. The base electrode section 9 is provided particularly on a lower surface 107 of the backlight section 8 as the second position. The base electrode BE is formed as a layer composed of a conductive member on the lower surface 107 of a case of the backlight section 8, for example. The base electrode BE may be formed by pasting a conductive film, for example.

In the first embodiment, the base electrode section 9 is below the backlight section 8. Thus, the base electrode section 9 does not need to have light transmissivity for transmitting the light from the backlight section 8. Thus, the base electrode section 9 does not need to use ITO or the like, and can use non-transmissive conductive member. The base electrode BE can use a metal such as aluminum which has high conductive efficiency and requires low cost. In addition, the base electrode section 9 may be obtained by depositing a conductor on a base material such as resin as a solid layer or a predetermined pattern layer, for example.

At the time of force sensing, the base electrode BE uses the second position in the Z-direction as its reference position. Namely, in a state where press is absent, a distance between the first position of the sensor electrode SE and the second position of the base electrode BE is constant as a reference. When the screen 102 of the display section 20 is pressed, the display section 20 is elastically deformed in the Z-direction while the base electrode BE is hardly elastically deformed. Alternatively, the base electrode section 9 may be elastically deformed. In the case, however, significantly smaller elastic deformation than that in the display section 20 only occurs in the base electrode section 9. When pressed, the display section 20 is bent in the X-Y plane while the base electrode BE is hardly bent in the X-Y plane, so that the second position in the Z-direction is maintained.

Namely, a space between the sensor electrode SE and the base electrode BE changes in accordance with the pressed state of the screen 102. More specifically, the sensor electrode SE positioned just below a pressed portion comes closest to the base electrode BE, and the space therebetween becomes narrowest. At this time, a space between the sensor electrode SE at a position planarly farthest away from the pressed portion and the base electrode BE hardly changes before and after the press.

The base electrode section 9 desirably maintains the second position in the Z-direction as its reference position. Thus, the base electrode BE is desirably composed of a member having predetermined rigidity or supported by the member having predetermined rigidity. In the first embodiment, the base electrode BE is formed in contact with the lower surface 107 of the case of the backlight section 8. The lower surface 107 of the case has predetermined rigidity, and thus the reference position of the base electrode section 9 is maintained regardless of the pressed state of the screen 102.

Each of the sensor electrodes SE in the sensor electrode section 4 is electrically connected to the circuit section through a connection line 201. The base electrode BE in the base electrode section 9 is electrically connected to the circuit section through a connection line 202. Note that a mounting configuration of the connection line for electrical connection between elements is not particularly limited. The connection line 201 and the connection line 202 may be configured as a substrate wiring layer, or may be configured by a flexible substrate or the like. The circuit section is mounted on a substrate surface such as the first substrate 5.

[Display Device_Functional Block Configuration]

Figure 3:
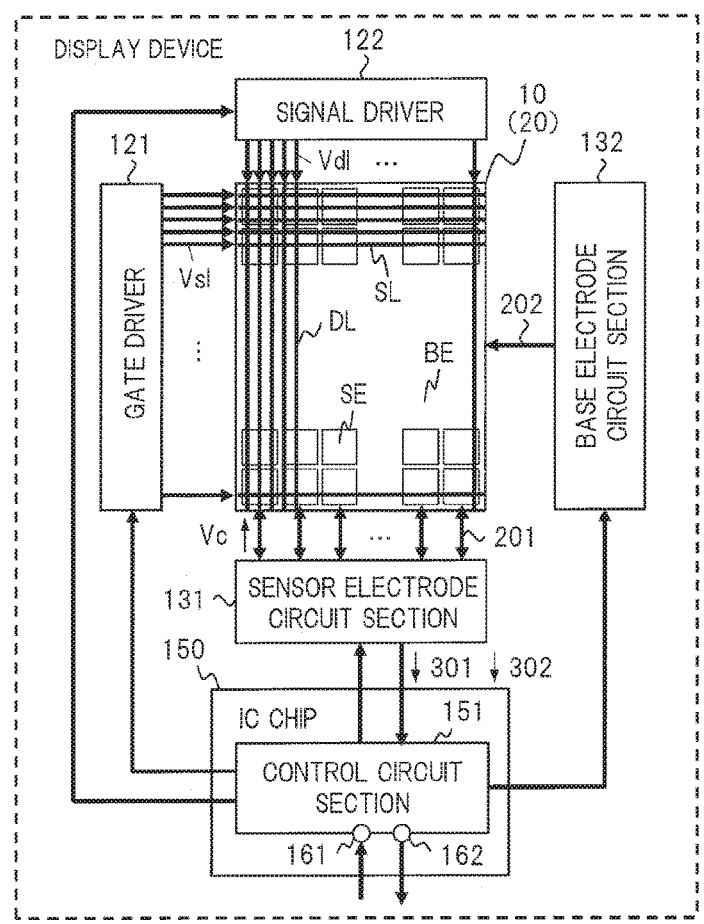
FIG. 3 illustrates a functional block configuration in the display device according to the first embodiment.

FIG. 3 illustrates a functional block configuration in the display device according to the first embodiment. The display device includes a control circuit section 151, a gate driver 121, a signal driver (display driver) 122, a sensor electrode circuit section 131, and a base electrode circuit section 132 as the circuit sections for the display section 20 in the main body section 10. The control circuit section 151 is mounted on an IC chip. The IC chip 150 is mounted on a part of a surface of the first substrate 5 in the display section 20.

The control circuit section 151, the sensor electrode circuit section 131, and the base electrode circuit section 132 are included in the circuit section 110 illustrated in FIG. 1. Circuit sections such as the gate driver 121, the signal driver 122, the sensor electrode circuit section 131, and the base electrode circuit section 132 are electrically connected to the control circuit section 151 through signal lines.

In the display section 20, for example, a plurality of scanning lines SL and a plurality of signal lines DL are formed in addition to the aforementioned sensor electrode SE and base electrode BE in the X-Y plane corresponding to the screen 102. The plurality of scanning lines SL are in parallel in the X-direction. The plurality of signal lines DL are in parallel in the Y-direction. The plurality of scanning lines SL and the plurality of signal lines DL are provided so as to correspond to a matrix of a plurality of pixels in the screen 102. The size of the sensor electrode SE is larger than arrangement pitches of the scanning lines SL and the signal lines DL.

The control circuit section 151 controls the entire display device, and feeds control signals and the like to circuit sections such as the gate driver 121. The control circuit section 151 has a video input terminal 161 and an output terminal 162. The video input terminal 161 is a terminal to which video data for displaying a video on the screen 102 is to be input. The output terminal 162 is a terminal from which touch sensing information and force sensing information described below are to be output. The control circuit section 151 performs driving control by synchronizing respective circuit sections such as the gate driver 121, the signal driver 122, and the sensor electrode circuit section 131 by the control signal and the like based on the video data input to the video input terminal 161. Thus, the control circuit section 151 implements the liquid crystal display function and the like.

The gate driver 121 drives the plurality of scanning lines SL in the display section 20 at the time of display based on the control signal. At this time, the gate driver 121 feeds scanning signals Vsl to the plurality of scanning lines SL. The gate driver 121 sequentially scans the plurality of scanning lines SL in a time-division manner by the scanning signals Vsl. The scanning signal Vsl is a voltage signal for selecting the scanning line SL corresponding to each of rows of pixels to be displayed.

The signal driver 122 drives the plurality of signal lines DL in the display section 20 at the time of display based on the control signal. At that time, the signal driver 122 feeds display signals Vdl to the plurality of signal lines DL. The display signal Vdl is a signal for controlling a display state of a pixel to be displayed and controlling the transmittance of a liquid crystal element depending on the luminance.

The sensor electrode circuit section 131 includes a driving circuit and a detection circuit described below. The sensor electrode circuit section 131 drives the plurality of sensor electrodes SE at the time of display, touch sensing, and force sensing based on the control signal, and detects signals from the plurality of sensor electrodes SE. The plurality of sensor electrodes SE are connected to the sensor electrode circuit section 131 through the connection lines 201.

The sensor electrode circuit section 131 applies a common voltage signal Vc to the sensor electrodes SE respectively facing pixel electrodes of the pixels to be displayed at the time of display. By applying the common voltage signal Vc to the sensor electrodes SE in this manner, the sensor electrode section 4 is used as a common electrode for display. As a modification example, a common electrode section may be provided separately from the sensor electrode section 4 in the display section 20. In this case, a common electrode driver for driving the common electrode section is provided separately from the sensor electrode circuit section 131.

The sensor electrode circuit section 131 applies a driving signal for touch sensing to the sensor electrode SE at the time of touch sensing, and detects a detection signal for touch sensing from the sensor electrode SE. The sensor electrode circuit section 131 includes a detection circuit for touch sensing. The detection circuit detects the presence or absence of touch, coordinates of touch position and the like based on the detection signal, and outputs a touch sensing signal 301 including them to the control circuit section 151. The sensor electrode circuit section 131 detects a detection signal for force sensing from the sensor electrode SE at the time of force sensing. The sensor electrode circuit section 131 includes a detection circuit for force sensing. The detection circuit calculates a pressing force and the like based on the detection signal, and outputs a force sensing signal 302 including them to the control circuit section 151.

The base electrode circuit section 132 includes a driving circuit described below. The base electrode circuit section 132 drives the base electrode BE in the base electrode section 9 in the display section 20 at the time of touch sensing and force sensing based on the control signal. The base electrode BE is connected to the base electrode circuit section 132 through the connection line 202. The base electrode circuit section 132 feeds a driving signal serving as a protection signal described below to the base electrode BE at the time of touch sensing. The base electrode circuit section 132 feeds a driving signal for force sensing to the base electrode BE at the time of force sensing.

The control circuit section 151 receives an input of the touch sensing signal 301 and the force sensing signal 302 from the sensor electrode circuit section 131, processes the signals therein, and feeds a control signal to each of the circuit sections based on the processing result. Also, the control circuit section 151 can output touch sensing information and force sensing information from the output terminal 162 based on the touch sensing signal 301 and the force sensing signal 302. The display device may output the touch sensing information and the force sensing information to the outside of the display device through an input/output interface section (not illustrated). Note that not only the control circuit section 151 but also another circuit section such as the sensor electrode circuit section 131 may be integrally mounted on the IC chip 150. In addition, a configuration in which a plurality of IC chips are provided and a plurality of circuit sections are mounted separately on the respective IC chips and linked between the IC chips is also possible. The IC chips may be mounted on a flexible substrate.

As a modification example, some functions of the sensor electrode circuit section 131 may be mounted in the control circuit section 151. For example, the sensor electrode circuit section 131 detects a voltage signal representing a change in capacitance as a detection signal from the sensor electrode section 4, and outputs the detection signal as it is to the control circuit section 151. The control circuit section 151 performs signal processing for touch sensing and force sensing based on the input detection signal, thereby obtaining the touch sensing signal 301 and the force sensing signal 302. Though described below, a modification example in which signal processing for touch sensing and force sensing is performed in a processor in an external device connected to the display device is also possible.

[Pixel]

Figure 4:
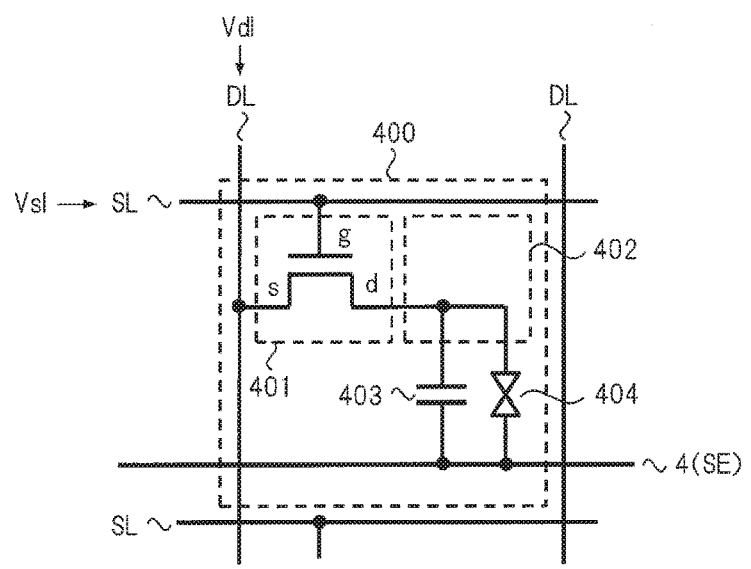
FIG. 4 illustrates a configuration of a pixel in the display device according to the first embodiment.

FIG. 4 illustrates an equivalent circuit of a configuration of a pixel 400 in the screen 102. In the X-Y plane corresponding to the screen 102, the plurality of scanning lines SL and the plurality of signal lines DL intersect each other. The pixel 400 is provided for each of regions defined by the scanning lines SL and the signal lines DL. A TFT element 401 and a pixel electrode 402 are provided for each of the pixels 400. The plurality of pixels 400 are arranged in a matrix in the screen 102. The pixel 400 corresponds to sub-pixels separated in three colors of red, green and blue, for example.

The TFT element 401 is a switching element for controlling a display state of the pixel 400, and is constituted of, for example, an n-channel MOS (Metal Oxide Semiconductor) as a thin film transistor (TFT). A gate terminal of the TFT element 401 is connected to the scanning line SL, a source terminal thereof is connected to the signal line DL, and a drain terminal thereof is connected to the pixel electrode 402. A capacitive element and a liquid crystal element are provided between the pixel electrode 402 and the sensor electrode section 4 serving as a common electrode section.

The scanning line SL is a gate line, and supplies the scanning signal Vsl to the gate terminal of the TFT element 401 in the pixel 400. The signal line DL is a source line, and supplies the display signal Vdl to the source terminal of the TFT element 401 in the pixel 400. The display signal Vdl is a voltage signal for applying a voltage to the pixel electrode 402 through the TFT element 401.

The pixel electrode 402 is provided for each of the pixels 400. The shape and the like of the pixel electrode 402 are not limited. A capacitive element 403 is formed between the pixel electrode 402 and a common electrode, and constitutes a holding capacitor relating to liquid crystal display. The liquid crystal element 403 is composed of a liquid crystal layer in the display section 20.

The TFT element 401 applies a voltage corresponding to the display signal Vdl input to the source terminal to the pixel electrode 402 from the drain terminal in accordance with an on-state of the scanning signal Vsl input to the gate terminal. The transmittance of the liquid crystal element 404 is controlled in accordance with the voltage applied to the pixel electrode 402.

[Display Section_Example of Mounting Structure]

Figure 5A:
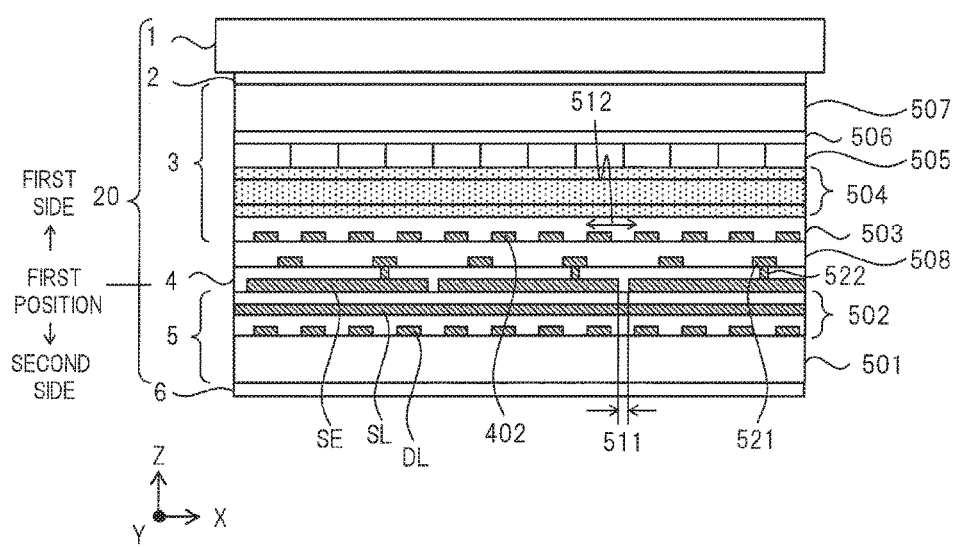
FIG. 5A illustrates a configuration of a cross section in a mounting example of a display section in the display device according to the first embodiment.

FIG. 5A illustrates a cross section of an example of a mounting structure of the display section 20. The cross section illustrated in FIG. 5A schematically represents a cross section in the X-Z plane corresponding to a line A-A illustrated in FIG. 1. FIG. 5A illustrates a case of the display section 20 having a transverse electric field mode, but the present invention is not limited to the transverse electric field mode. The display section 20 has the following configuration in the order from below in the Z-direction.

A glass substrate 501 in the first substrate 5 is provided on the first polarizing plate 6. A TFT layer 502 including the TFT element 401 is formed on the glass substrate 501. The plurality of signal lines DL extending in the Y-direction and an insulating film covering the signal lines DL are first formed in the TFT layer 502. The plurality of scanning lines SL extending in the X-direction and an insulating film covering the scanning lines SL are formed on the layer of the signal lines DL. Illustration of the TFT element 401 is omitted.

A layer of the sensor electrode section 4 is formed on the TFT layer 502. As the layer of the sensor electrode section 4, the plurality of sensor electrodes SE and an insulating film covering the sensor electrodes SE are formed. Also, a contact hole 522 for each of the sensor electrodes SE is formed in the insulating film. A conductive member, which connects each of the sensor electrodes SE and a connection line 521 in a connection line layer 508 to each other, is formed in the contact hole 522. While about four pixel electrodes 402 are arranged for one sensor electrode SE in the X-direction in this example, the present invention is not limited to this.

The connection line layer 508 is formed on the layer of the sensor electrode section 4. The plurality of connection lines 521 and an insulating film covering the connection lines 521 are formed in the connection line layer 508. The connection line 521 is a wiring which electrically connects the sensor electrode SE and the sensor electrode circuit section 131 to each other, and is formed in the display section 20. The connection line 521 is composed of, for example, metal, extends in the Y-direction, and is arranged at a position of a pixel boundary. A pixel electrode layer 503 in the second substrate 3 is formed on the connection line layer 508. In the pixel electrode layer 503, the plurality of pixel electrodes 402 and an insulating film covering the pixel electrodes 402 are formed.

A liquid crystal layer 504 is formed on the pixel electrode layer 503. In the liquid crystal layer 504, liquid crystal molecules are sealed between a first alignment film and a second alignment film. A color filter layer 505 is formed on the liquid crystal layer 504. In the color filter layer 505, layers for respective colors are arranged in a predetermined order so as to correspond to a pixel array. A light shielding layer 506 is formed on the color filter layer 505. The light shielding layer 506 is a layer for covering and blackening the pixel boundary, for example. A glass substrate 507 is arranged on the light shielding layer 506. The second polarizing plate 2 is arranged on the glass substrate 507.

Figure 5B:
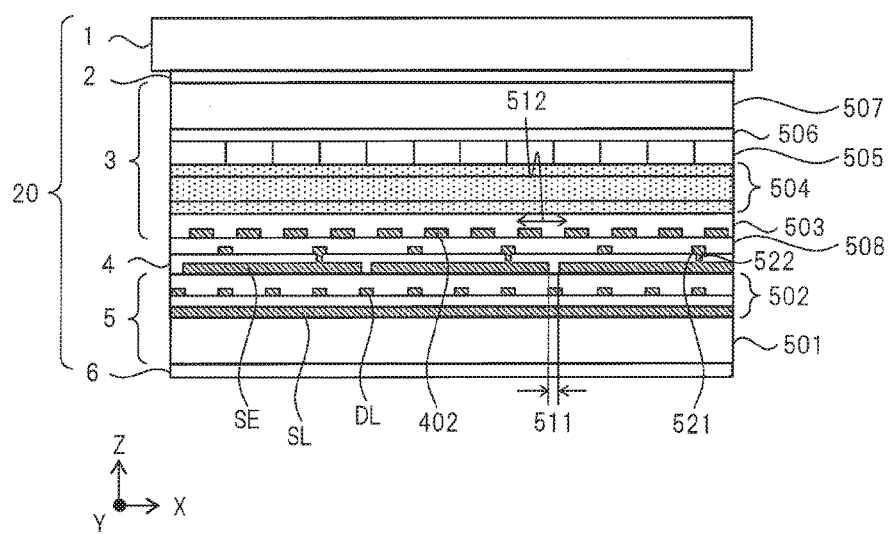
FIG. 5B illustrates another configuration of a cross section in a mounting example of the display section in the display device according to the first embodiment.

FIG. 5B illustrates a cross section in another example of a mounting structure of the display section 20. A configuration illustrated in FIG. 5B is different from that illustrated in FIG. 5A in the following points. First, in the TFT layer 502 on the glass substrate 501, the plurality of scanning lines SL extending in the X-direction and an insulating film covering the scanning lines SL are formed. On the layer of the scanning lines SL, the plurality of signal lines DL extending in the Y-direction and an insulating film covering the signal lines DL are formed. In the connection line layer 508, the plurality of connection lines 521 are formed at positions overlapping the signal lines DL in the TFT layer 502.

[Separation Function]

The sensor electrode section 4 has a separation function described below, in other words, a protection function. The plurality of sensor electrodes SE in the sensor electrode section 4 are provided in a matrix with a short gap therebetween in the X-Y plane at the first position in the Z-direction as illustrated in FIGS. 1 and 2. A distance of the gap between the sensor electrodes SE adjacent to each other in each of the X-direction and the Y-direction is not more than the width of the pixel or the pixel electrode 402 in the screen 102 or a distance of an arrangement pitch of the pixels. The pixel indicates the pixel 400 illustrated in FIG. 4 and corresponds to a region defined by the scanning lines SL and the signal lines DL. The distance of the gap between the sensor electrodes SE is several micrometers to several tens of micrometers, for example. FIG. 5A illustrates a distance 511 of the gap between the sensor electrodes SE in the X-direction, and illustrates a distance 512 of an arrangement pitch of the pixel electrodes 403 in the X-direction. The distance 511 of the gap between the sensor electrodes SE is smaller than the distance 512 of the arrangement pitch of the pixel electrodes 403. Thus, the sensor electrode section 4 implements the separation function.

The gap between the sensor electrodes SE is smaller than the size of the pixel. Thus, the degree to which an electric field leaks out through the gap between the sensor electrodes SE in the Z-direction is sufficiently small. Accordingly, the sensor electrode section 4 implements the separation function of separating the influence of an electric field and a capacitance between the first side and the second side with respect to the first position illustrated in FIGS. 2 and 5A in the Z-direction. The separation function suppresses the mutual influence of the second capacitance C2 on the first side and the first capacitance C1 on the second side illustrated in FIG. 2. Namely, leakage of an electric field generated between the sensor electrode SE and the base electrode BE at the time of force sensing toward the first side is sufficiently suppressed, and leakage of an electric field generated in the sensor electrode SE at the time of touch sensing toward the second side is also sufficiently suppressed. As a result, it is possible to prevent the first capacitance C1 from being affected and changed by the second capacitance C2 at the time of force sensing, and to prevent the second capacitance C2 from being affected and changed by the first capacitance C1 at the time of touch sensing. Thus, the finger signal and the force signal in the detection signal are easily separated from each other. Alternatively, the finger signal and the force signal in the detection signal can be separately extracted.

[Sensor Electrode Circuit Section]

Figure 6:
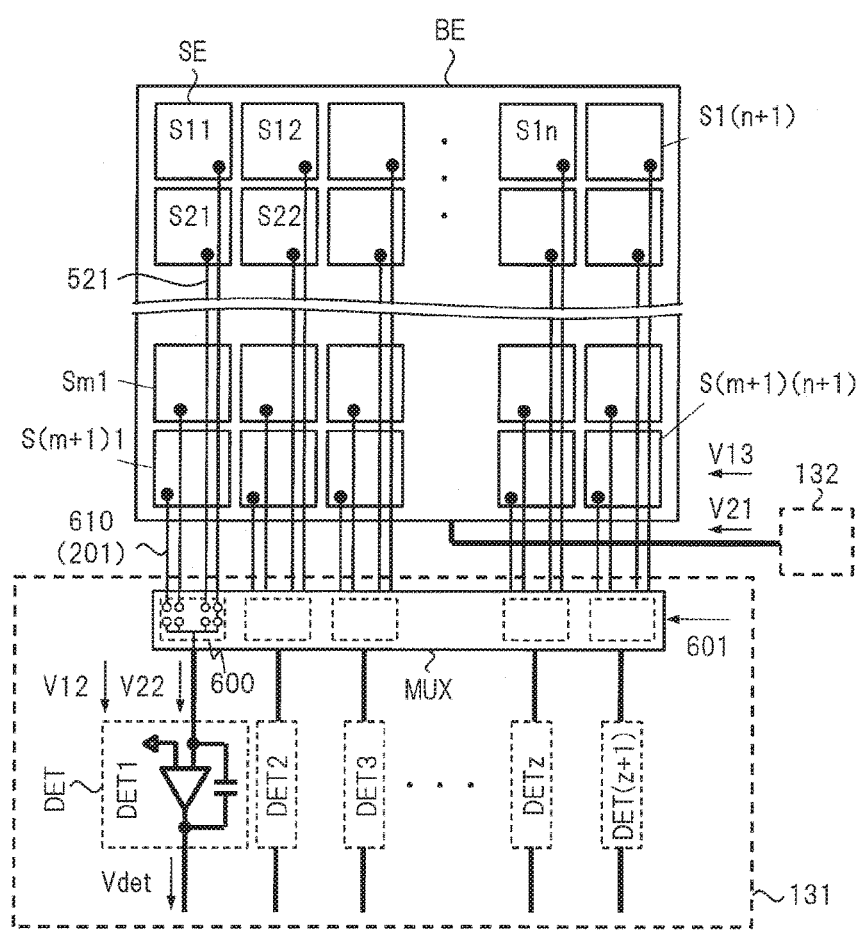
FIG. 6 illustrates an example of a configuration of a sensor electrode circuit section in the display device according to the first embodiment.

FIG. 6 mainly illustrates a configuration of the sensor electrode circuit section 131. The sensor electrode circuit section 131 includes a detection circuit and a driving circuit for the sensor electrode section 4. The detection circuit includes a multiplexer MUX and a plurality of detectors DET. The plurality of detectors DET include detectors DET1, DET2, . . . , DET(z+1). The number of detectors DET is set to (z+1). FIG. 6 illustrates a circuit configuration when the number (z+1) of detectors DET is made equal to the number (n+1) of columns of sensor electrodes SE (z=n). The number (z+1) of detectors DET is not limited to this and other numbers are also applicable.

Each of the plurality of sensor electrodes SE is electrically connected to the multiplexer MUX through the connection line 521 illustrated in FIG. 5A and a connection line 610. The connection line 610 is a part connected to the connection line 521 and extracted outward from the display section 20, and corresponds to a part of the connection line 201 illustrated in FIG. 2. The multiplexer MUX is a circuit which makes it possible to select the sensor electrodes SE to be detected in a single detection from the plurality of sensor electrodes SE. The multiplexer MUX receives an input of signals from the plurality of sensor electrodes SE through the connection lines 610. The multiplexer MUX selects the signal from these signals in accordance with a control signal 601, and outputs the selected signal to the plurality of detectors DET. In the example illustrated in FIG. 6, the (m+1) sensor electrodes SE are connected to a circuit 600 in the multiplexer MUX as a block for each column of the sensor electrodes SE. The multiplexer MUX includes a plurality of circuits 600. The circuit 600 selects the signal from one sensor electrode SE among respective signals from the (m+1) sensor electrodes SE for each of the columns, and outputs the selected signal to the one detector DET connected to the circuit 600.

In the detection circuit illustrated in FIG. 6, the signals from the (n+1) sensor electrodes SE as a block for each row in the sensor electrode section 4 can be detected at each timing by the (z+1) detectors DET. Further, in the detection circuit, the signals from all the detection electrodes SE in the sensor electrode section 4 can be detected by detecting the signals sequentially for each of the rows of sensor electrode SE, that is, at (m+1) timings.

The detector DET receives an input of a touch signal V12 or a sensor detection signal V22 described below serving as a signal from the sensor electrode SE, and outputs a detection signal Vdet. The detection signal Vdet is a voltage signal representing a capacitance value relating to the sensor electrode SE. The detection circuit performs the touch sensing and the force sensing based on the detection signal Vdet.

The base electrode circuit section 132 applies a protection signal V13 or a sensor driving signal V21 described below to the base electrode BE.

[Detector]

Figure 7:
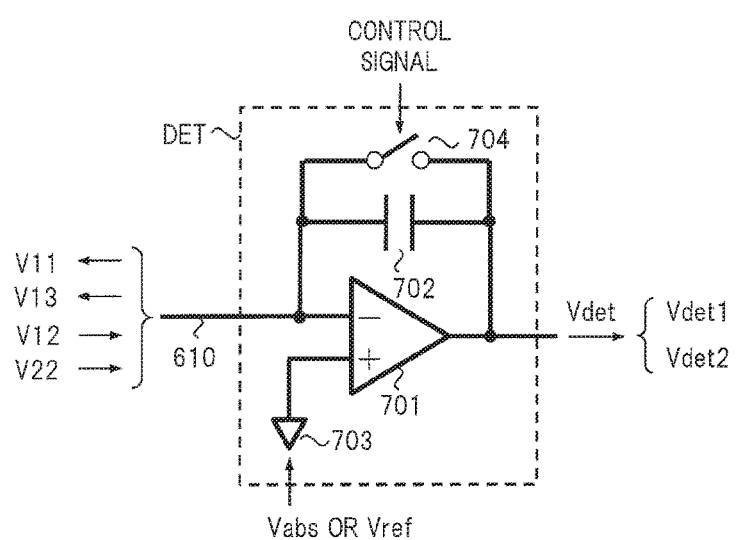
FIG. 7 illustrates an example of a configuration of a detector in the display device according to the first embodiment.

FIG. 7 illustrates a configuration of the detector DET illustrated in FIG. 6. The detector DET includes an integrator 701, a capacitive element 702, a reference voltage signal terminal 703, and a switch 704. The integrator 701 is composed of an operational amplifier. The integrator 701 has a negative input terminal, a positive input terminal, and an output terminal. The negative input terminal is connected to the sensor electrode SE through the connection line 610. A voltage signal based on a current from the sensor electrode SE is input to the negative input terminal. The voltage signal to be input includes the touch signal V12 and the sensor detection signal V22 at the time of force sensing. Also, a voltage signal to the sensor electrode SE is output from the negative input terminal. The voltage signal to be output includes a touch driving signal V11 and the like. The output terminal of the integrator 701 is connected to another circuit within the detection circuit through a signal line, and outputs the detection signal Vdet. The detection signal Vdet includes a detection signal Vdet1 at the time of touch sensing and a detection signal Vdet2 at the time of force sensing.

The capacitive element 702 constitutes a feedback capacitance, and is connected between the negative input terminal and the output terminal of the integrator 701. Also, the switch 704 is connected between the negative input terminal and the output terminal of the integrator 701 in parallel with the capacitive element 702. The switch 704 is switched between an on-state and an off-state based on a control signal input to a control terminal. When the switch 704 is in an on-state, the negative input terminal and the output terminal of the integrator 701 are short-circuited.

The reference voltage signal terminal 703 is connected to the positive input terminal of the integrator 701. A driving voltage signal Vabs at the time of touch sensing and a reference voltage signal Vref at the time of force sensing are input as reference voltage signals to the reference voltage signal terminal 703. The detector DET receives an input of the driving voltage signal Vabs or the reference voltage signal Vref selected as a reference voltage signal of the integrator 701. The driving voltage signal Vabs is a periodic signal. The reference voltage signal Vref is a voltage signal having a predetermined reference potential.

An imaginary short has occurred between the positive input terminal and the negative input terminal of the integrator 701. The switch 704 is turned off when the sensor electrode SE is electrically connected to the detector DET, and the switch 704 is turned on when the sensor electrode SE is not electrically connected to the detector DET. When the driving voltage signal Vabs is input to the positive input terminal of the integrator 701, a voltage signal based on the driving voltage signal Vabs is applied to the sensor electrode SE connected to the negative input terminal through the imaginary short. Thus, the touch driving signal V11 or the like can be applied to the sensor electrode SE through the detector DET.

Since the second capacitance C2 is present in the sensor electrode SE, a difference voltage is generated for the touch driving signal V11 applied to the sensor electrode SE. A current corresponding to the difference voltage flows to the negative input terminal of the integrator 701 in the detector DET. Namely, as the touch driving signal V11 is applied to the sensor electrode SE, the touch signal V12 is input to the detector DET from the sensor electrode SE. The integrator 701 in the detector DET converts a current of the touch signal V12 into a voltage, and detects the voltage as the detection signal Vdet.

[Detection Circuit_Functional Block Configuration]

Figure 8:
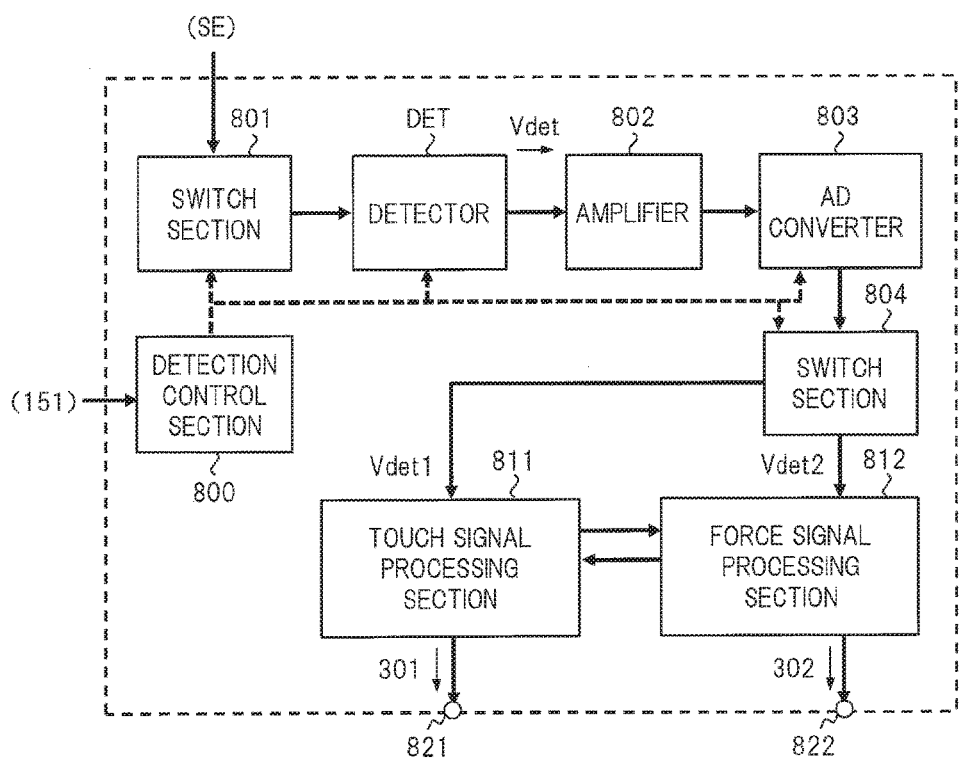
FIG. 8 illustrates a functional block configuration of a detection circuit in the display device according to the first embodiment.

FIG. 8 illustrates a functional block configuration of the detection circuit in the sensor electrode circuit section 131. The detection circuit includes a detection control section 800, a switch section 801, a detector DET, an amplifier 802, an AD converter 803, a switch section 804, a touch signal processing section 811, a force signal processing section or processor 812, a touch signal output terminal 821, and a force signal output terminal 822.

The detection control section 800 controls the touch sensing and the force sensing in a time-division manner by controlling respective sections such as the switch section 801 in the detection circuit based on the control signal from the control circuit section 151. The detection control section 800 performs control to turn the switch section 804 to a first state to switch to the touch signal processing section 811 in a touch period T1 described below, and to turn the switch section 804 to a second state to switch to the force signal processing section 812 in a force period T2.

The switch section 801 receives an input of the voltage signal from the sensor electrode SE, and outputs the voltage signal to the detector DET when it is in an on-state, and does not output the voltage signal when it is in an off-state. The detector DET receives an input of the voltage signal from the sensor electrode SE, and outputs the detection signal Vdet. The amplifier 802 amplifies the detection signal Vdet. The amplifier 802 may include a passband filter or the like. The AD converter 803 is an analog-to-digital converter, and converts an analog voltage signal from the amplifier 802 into a digital value, and outputs the digital value as a detection signal.

The switch section 804 receives an input of the detection signal from the AD converter 803, and switches an output designation of the detection signal based on the control signal from the detection control section 800. The switch section 804 outputs a signal corresponding to the detection signal Vdet1 to the touch signal processing section 811 when it is in the first state, and outputs a signal corresponding to the detection signal Vdet2 to the force signal processing section 812 when it is in the second state.

The touch signal processing section 811 performs signal processing for touch sensing. The touch signal processing section 811 detects a voltage difference value corresponding to a capacitance difference value associated with the sensor electrode SE, in other words, the aforementioned finger signal based on the detection signal. The touch signal processing section 811 determines the presence or absence of touch or the like and calculates coordinates of touch position within the screen 102 based on the voltage difference value. The touch signal processing section 811 outputs the touch sensing signal 301 including the information thereof to the control circuit section 151 from the touch signal output terminal 821.

The force signal processing section 812 performs signal processing for force sensing. The force signal processing section 812 detects a voltage difference value corresponding to a capacitance difference value associated with the sensor electrode SE, in other words, the aforementioned force signal based on the detection signal. The force signal processing section 812 calculates a pressing force or the like onto the screen 102 based on the voltage difference value. The force signal processing section 812 outputs the force sensing signal 302 including the information thereof to the control circuit section 151 from the force signal output terminal 822.

In the configuration of the detection circuit, elements such as the detector DET and the amplifier 802 are shared between the touch sensing and the force sensing. The present invention is not limited to this, and a detection circuit for touch sensing and a detection circuit for force sensing may be separately provided in parallel.

Also, touch sensing information obtained by the touch signal processing section 811 may be given to the force signal processing section 812 for use in the force sensing processing. In addition, force sensing information obtained by the force signal processing section 812 may be given to the touch signal processing section 811 for use in the touch sensing processing. Examples of use include the use of coordinates of touch position for the calculation of a pressing force.

Figure 27:
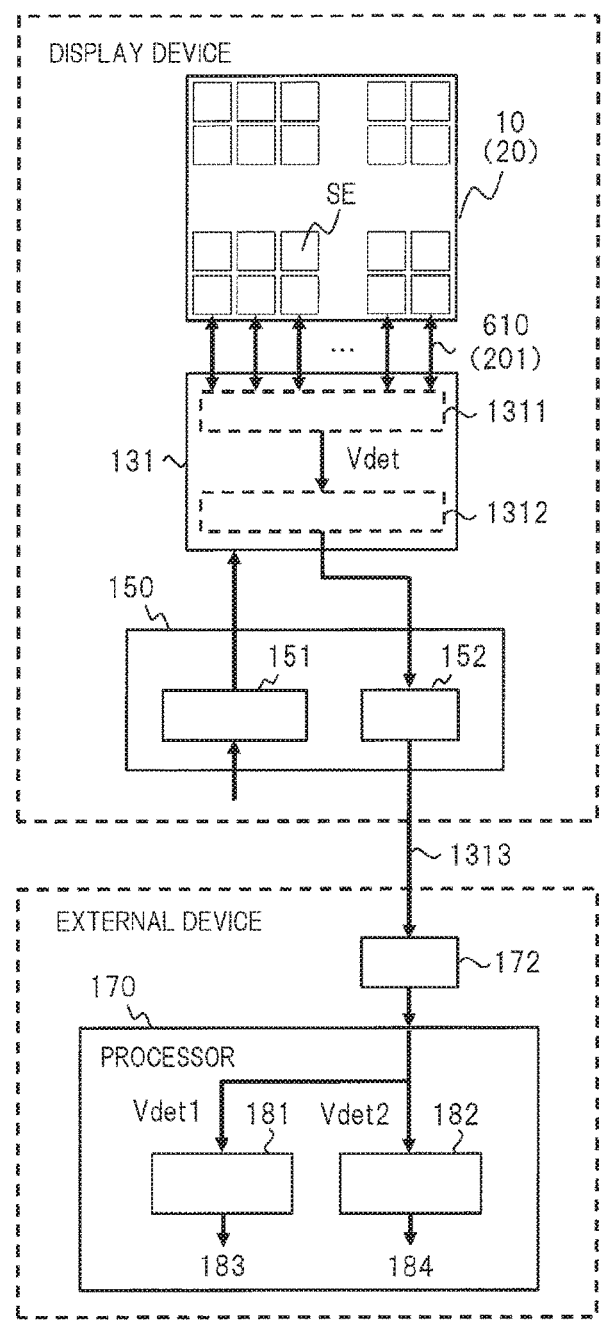
FIG. 27 illustrates a functional block configuration of a system including the display device according to the first modification example to the first embodiment.

FIG. 27 illustrates a functional block configuration of a system including a display device in a modification example to the first embodiment. In this modification example, a processor 170 in an external device connected to the display device includes a touch signal processing section 181 and a force signal processing section 182 respectively corresponding to the touch signal processing section 811 and the force signal processing section 812 illustrated in FIG. 8. A sensor electrode circuit section 131 in the display device according to the modification example includes elements respectively corresponding to the switch section 801, the detector DET, the amplifier 802, and the AD converter 803 illustrated in FIG. 8 as a detection circuit. The sensor electrode circuit section 131 includes a detection section 1311 including a plurality of detectors DET and an AD conversion section 1312 including the elements respectively corresponding to the amplifier 802 and the AD converter 803 illustrated in FIG. 8. Namely, the display device in the modification example has a function of outputting a digital detection signal after AD conversion as a function for the touch sensing and the force sensing.

The sensor electrode circuit section 131 detects the detection signal Vdet by the detection section 1311 from the sensor electrode SE in the sensor electrode section 4, converts the detection signal Vdet into a digital detection signal by the AD conversion section 1312, and outputs the digital detection signal as it is. The detection signal is output outward as data 1313 through the input/output interface section 152 in the IC chip 150. The data 1313 includes a detection signal Vdet1 for touch sensing and a detection signal Vdet2 for force sensing in a predetermined order of time-division. Note that the data 1313 may include information for identifying the detection signal Vdet1 and the detection signal Vdet2. An input/output interface section 172 in the external device is connected to the input/output interface section 152 in the display device through a communication line, and is mutually communicable with each other. The data 1313 output outward is input to the external device through the input/output interface section 172, and is delivered to the processor 170.

The processor 170 in the external device performs signal processing for touch sensing and force sensing in a time-division manner by using the data 1313 of the input detection signal. Namely, the touch signal processing section 181 in the processor 170 performs touch signal processing by using the detection signal Vdet1 to obtain a touch sensing signal 183. The force signal processing section 182 in the processor 170 performs force signal processing by using the detection signal Vdet2 to obtain a force sensing signal 184. The processor 170 can perform predetermined control by using the touch sensing signal 183 and the force sensing signal 184. Alternatively, the processor 170 may transmit the touch sensing signal 183 and the force sensing signal 184 to the control circuit section 151 in the display device through the input/output interface section 172. The control section 151 can perform predetermined control by using the touch sensing signal 183 and the force sensing signal 184.

As a modification example, the configuration in which a display device includes the touch signal processing section 811 and an external device includes the force signal processing section 182 is also possible. Alternatively, the configuration in which an external device includes the touch signal processing section 181 and a display device includes the force signal processing section 812 is also possible.

[Circuit Section_Details]

Figure 9:
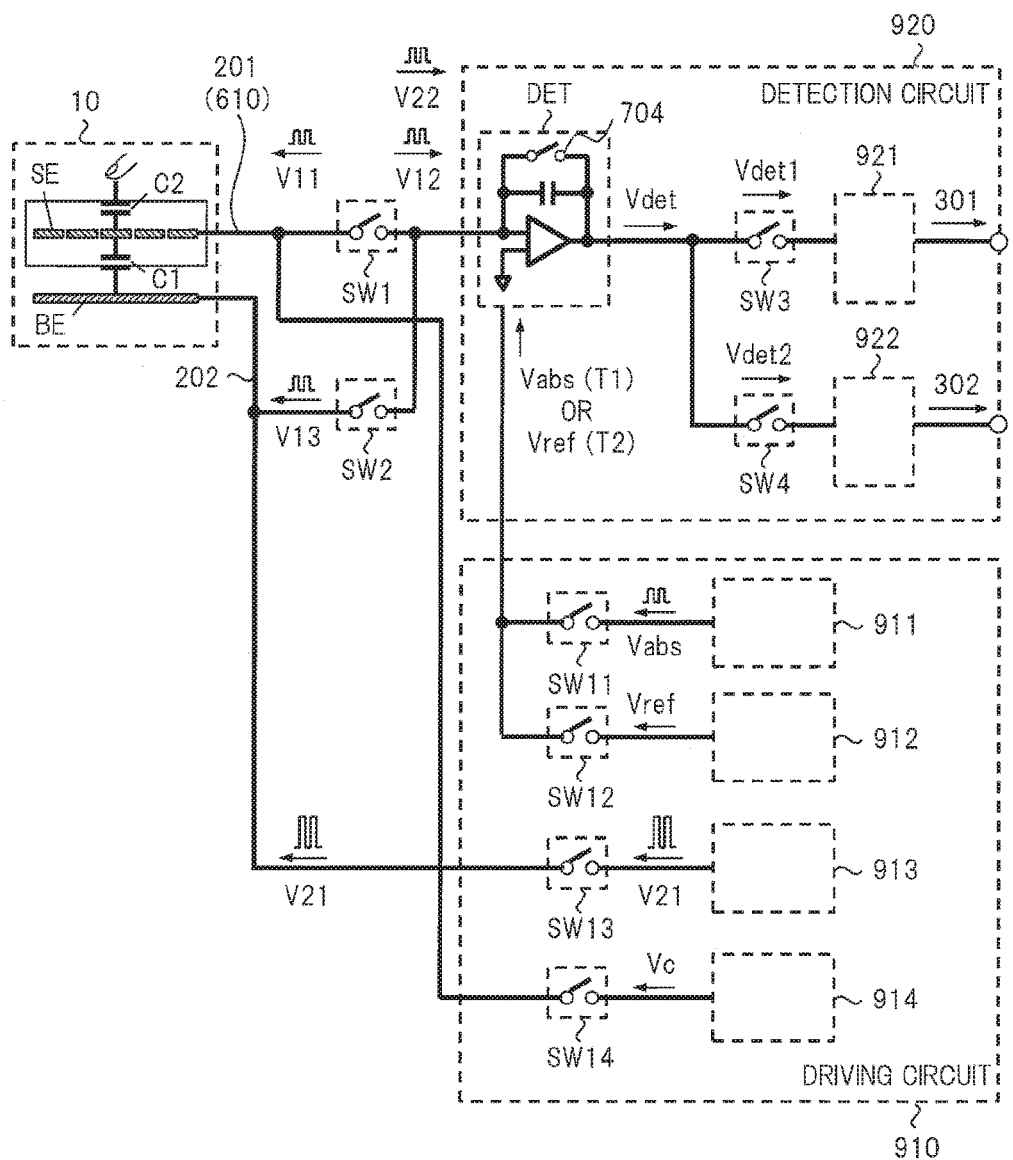
FIG. 9 illustrates a configuration of a driving circuit and a detection circuit each relating to a sensor electrode and a base electrode in the display device according to the first embodiment.

FIG. 9 illustrates a specific configuration of the sensor electrode circuit section 131 and the base electrode circuit section 132 in the circuit section. The circuit configuration illustrated in FIG. 9 includes a driving circuit 910 and a detection circuit 920 each relating to touch sensing and force sensing. The driving circuit 910 includes a driving voltage signal circuit section 911, a reference voltage signal circuit section 912, a sensor driving signal circuit section 913, a common voltage signal circuit section 914, and switches SW11 to SW14. The detection circuit 920 includes a plurality of detectors DET, a switch SW3, a switch SW4, a touch sensing circuit section 921, and a force sensing circuit section 922. In addition, the circuit illustrated in FIG. 9 includes a switch SW1, a switch SW2, and signal lines which connect respective elements. Each of the switches SW1 to SW4 and SW11 to SW14 is switched between an on-state and an off-state based on a control signal input to a control terminal.

The driving circuit 910 and the detection circuit 920 are electrically connected to the sensor electrode SE through the connection line 201 including the connection line 610. The driving circuit 910 and the detection circuit 920 are electrically connected to the base electrode BE through the connection line 202. The sensor electrode SE is connected to an input of the detector DET through the switch SW1. The sensor electrode SE is connected to the common voltage signal circuit 914 through the switch SW14. The base electrode BE is connected to the input of the detector DET through the switch SW2. The base electrode BE is connected to the sensor driving signal circuit section 913 through the switch SW13.

An output of the detector DET is connected to the touch sensing circuit section 921 through the switch SW3, and is connected to the force sensing circuit section 922 through the switch SW4. The reference voltage signal terminal 703 of the integrator 701 in the detector DET is connected to the driving voltage signal circuit section 911 through the switch SW11, and is connected to the reference voltage signal circuit section 912 through the switch SW12.

The driving voltage signal circuit section 911 generates a driving voltage signal Vabs. The driving voltage signal Vabs is input to the positive input terminal of the integrator 701 through the reference voltage signal terminal 703 of the integrator 701 in the detector DET when the switch SW11 is in an on-state. The driving voltage signal Vabs is a voltage signal for generating the touch driving signal V11 and the protection signal V13. The frequency of the driving voltage signal Vabs is several kilohertz to several hundred kilohertz, for example.

The reference voltage signal circuit section 912 generates a reference voltage signal Vref. The reference voltage signal Vref is input to the positive input terminal of the integrator 710 through the reference voltage signal terminal 703 of the integrator 701 in the detector DET when the switch SW12 is in an on-state. The reference voltage signal Vref serves as a reference voltage at the time of force sensing.

The sensor driving signal circuit section 913 generates the sensor driving signal V21. The sensor driving signal V21 is a periodic signal serving as a driving signal at the time of force sensing. The sensor driving signal V21 is supplied to the base electrode BE when the switch SW13 is in an on-state.

The common voltage signal circuit section 914 generates a common voltage signal Vc for display. The common voltage signal Vc is applied to the sensor electrode SE in the sensor electrode section 4 when the switch SW14 is in an on-state.

The detector DET receives an input of the touch signal V12 from the sensor electrode SE at the time of touch sensing, and outputs the touch signal V12 as the detection signal Vdet. The detector DET receives an input of the sensor detection signal V22 from the sensor electrode SE at the time of force sensing, and outputs the sensor detection signal V22 as the detection signal Vdet. The detection signal Vdet from the detector DET is input to the touch sensing circuit section 921 as a detection signal Vdet1 when the switch SW3 is in an on-state, and is input to the force sensing circuit section 922 as a detection signal Vdet2 when the switch SW4 is in an on-state.

The touch sensing circuit section 921 has a function similar to that of the touch signal processing section 811 illustrated in FIG. 8. The touch sensing circuit section 921 performs processing relating to the touch sensing based on the detection signal Vdet1, and outputs a touch sensing signal 301 serving as a result of the processing. The force sensing circuit section 922 has a function similar to that of the force signal processing section 812 illustrated in FIG. 8. The force sensing circuit section 922 performs processing relating to the force sensing based on the detection signal Vdet2, and outputs a force sensing signal 302 serving as a result of the processing.

In the circuit configuration illustrated in FIG. 9, the same waveform having the same phase is branched as the touch driving signal V11 and the protection signal V13, and the touch driving signal V11 and the protection signal V13 are simultaneously applied to the sensor electrode SE and the base electrode BE, respectively, through the detector DET based on the driving voltage signal Vabs.

The circuit configuration is not limited to this, and the following circuit configuration may be used as a modification example. In the modification example, separate driving circuit sections are respectively provided for the sensor electrode SE and the base electrode BE, and the respective driving signals are applied thereto in parallel. The touch driving signal V11 is applied to the sensor electrode SE without through the detector DET from the one driving circuit section, and the protection signal V13 is applied to the base electrode BE without through the detector DET from the other driving circuit section. The touch driving signal V11 and the protection signal V13 may have respectively different waveforms having the same phase. The reference voltage signal Vref is input as a reference voltage signal of the integrator 701 in the detector DET.

[Display Method]

A display method according to the first embodiment is a method for performing the force sensing relating to a pressed state of the screen 102 of the display device with an object (sensed object) and the touch sensing relating to a touched state. In the display method according to the first embodiment, a time-division period includes the touch period T1 in which the touch sensing is performed and the force period T2 in which the force sensing is performed. The display method according to the first embodiment includes a first step and a second step described below as the steps of controlling the sensor electrode section 4, the base electrode section 9, and the like in the main body section 10 by the circuit section.

In the first step, the circuit section supplies the sensor driving signal V21 to the base electrode section 9 and receives the sensor detection signal V22 from the sensor electrode section 4 through the first capacitance C1 in the force period T2. Then, the circuit section detects a change of the first capacitance C1 based on the sensor detection signal V22, calculates a pressing force corresponding to the pressed state based on the change of the first capacitance C1, and outputs the force sensing signal 302 including the pressing force.

In the second step, the circuit section applies the touch driving signal V11 to the sensor electrode section 4 and detects the touch signal V12 from the sensor electrode section 4 in the touch period T1. Then, the circuit section detects a change of the second capacitance C2 based on the touch signal V12, calculates the presence or absence of touch and coordinates of touch position depending on a touched state based on the change of the second capacitance C2, and outputs the touch sensing signal 301 including the presence or absence of touch and the coordinates of touch position. Further, in the second step, the circuit section applies the protection signal V13 to the base electrode section 9.

In the display device and the display method according to the first embodiment, different types of driving and detection are respectively performed in a time-division manner in the touch sensing and the force sensing. Namely, the display device performs self capacitance touch sensing using the sensor electrode section 4 in the touch period T1, and performs mutual capacitance force sensing using the sensor electrode section 4 and the base electrode section 9 in the force period T2.

In the self capacitance touch sensing in the touch period T1, the circuit section detects the change of the second capacitance C2 mainly formed between a finger (sensed object) and the sensor electrode SE from the sensor electrode SE. In the touch period T1, the finger signal corresponding to the second capacitance C2 becomes a main component in the detection signal, and a component of the force signal corresponding to the first capacitance C1 is suppressed.

In the mutual capacitance force sensing in the force period T2, the circuit section uses the base electrode BE as a transmission electrode and uses the sensor electrode SE as a receiving electrode, and mainly detects the change of the first capacitance C1 between the base electrode BE and the sensor electrode SE. The circuit section detects a change of the first capacitance C1 and a change of the second capacitance C2 due to bending of the display section 20 by press as voltage signals. In the force period T2, the force signal corresponding to the first capacitance C1 becomes a main component in the detection signal, and a component of the finger signal corresponding to the second capacitance C2 is suppressed.

[Timing Chart]

Figure 10:
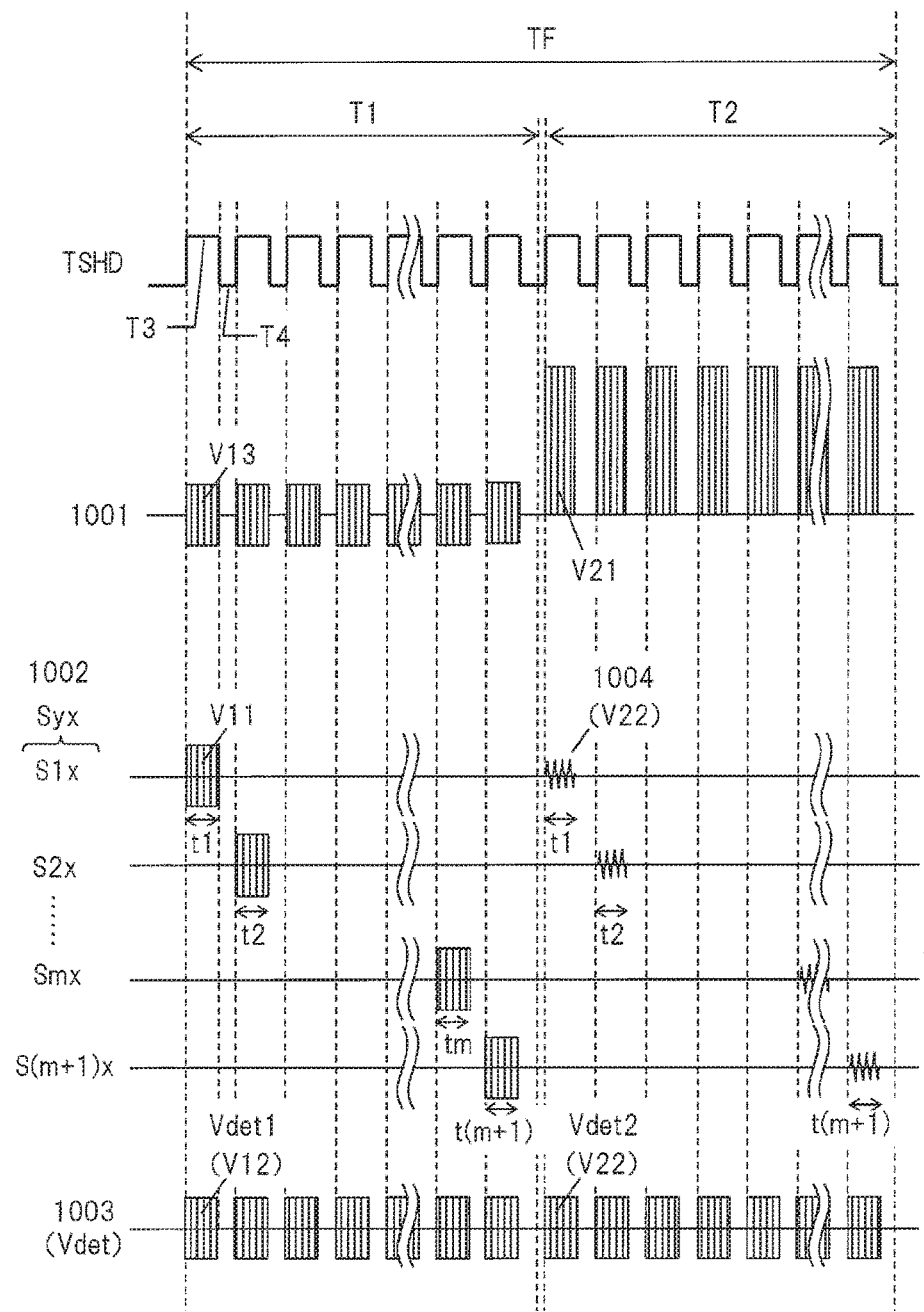
FIG. 10 illustrates a configuration in a display frame period as a timing chart in the display device and a display method according to the first embodiment.

FIG. 10 illustrates a configuration of a display frame period TF as a timing chart relating to the display device and the display method according to the first embodiment. The display frame period TF is a period in which one frame of a video is to be displayed, and is roughly divided into two periods, that is, the touch period T1 and the force period T2. In FIG. 10, a time-division control signal TSHD, a base electrode driving signal 1001, a sensor electrode signal 1002, and a sensor electrode detection signal 1003 are illustrated as signals in this order from above.

Each of the touch period T1 and the force period T2 is further time-divided into two periods, that is, a detection period T3 and a display period T4 based on the time-division control signal TSHD. Detection in the detection period T3 and display in the display period T4 are alternately and repeatedly performed. Each of the touch period T1 and the force period T2 includes a plurality of detection periods T3 and a plurality of display periods T4, and the detection periods T3 and the display periods T4 are provided alternately. Details of the display period T4 are omitted. In the display period T4, a scanning signal Vsl is applied to the aforementioned scanning line SL, a display signal Vdl is applied to the signal line DL, and a common voltage signal Vc is applied to the sensor electrode section 4.

First, in the detection period T3 in the touch period T1, the touch driving signal V11 is applied to the plurality of sensor electrodes SE in the sensor electrode section 4. In FIG. 10, each of the sensor electrodes SE in the matrix of the sensor electrodes SE in the sensor electrode section 4 illustrated in FIG. 1 is indicated by Syx, where y represents a plurality of rows arranged in the Y-direction and includes 1 to (m+1), and x represents a plurality of columns arranged in the X-direction and includes 1 to (n+1). FIG. 10 illustrates an example in which the plurality of sensor electrodes SE in the sensor electrode section 4 are sequentially detected at a plurality of timings and particularly for each of the rows of sensor electrodes SE so as to correspond to the configuration of the detection circuit illustrated in FIG. 6. Each of x represents the column individually connected for each of the detectors DET, and the rows y are sequentially selected from 1 to (m+1). The number of times of sequential detection corresponds to the number of rows (m+1) of the sensor electrodes SE, and sequential detection periods t1 to t(m+1) are provided.

In the first embodiment, the sensor electrodes SE for each of the columns among the plurality of sensor electrodes SE in the sensor electrode section 4 constitute a block. The plurality of detectors DET are provided to correspond to a plurality of blocks. Each of the detectors DET can be connected to each block. Each of the detectors DET sequentially detects the detection signal from each of the plurality of sensor electrodes SE in the connected block.

In the example illustrated in FIG. 10, in the first timing period t1, the plurality of detectors DET collectively perform the detection for a plurality of sensor electrodes {S1x} corresponding to the first row of y=1 at one time. More specifically, in each of the blocks, each of the sensor electrodes {S1x} and the detector DET are connected to each other through the circuit 600 in the multiplexer MUX. At this time, the remaining sensor electrodes SE and the detector DET remain unconnected. The sensor electrode {S1x} represents sensor electrodes S11, S12, . . . , and S1(n+1). In the subsequent timing period t2, the detection is performed for a plurality of sensor electrodes {S2x} corresponding to the second row of y=2. More specifically, in each of the blocks, each of the sensor electrodes {S2x} and the detector DET are connected to each other through the circuit 600 in the multiplexer MUX. Similarly, in the last timing period t(m+1), the detection is performed for the sensor electrode {S(m+1)x} corresponding to the (m+1)-th row.

Also, in the detection period T3 in the touch period T1, the protection signal V13 is applied to the base electrode BE. The protection signal V13 is a periodic signal having the same phase as the phase of the touch driving signal V11.

In the detection period T3 in the touch period T1, the detector DET detects the detection signal Vdet1 based on the touch signal V12 from the sensor electrode SE which is in a connected state. The touch signal V12 is a periodic signal corresponding to the touch driving signal V11.

Next, in the detection period T3 in the force period T2, the sensor driving signal V21 is supplied to the base electrode BE. The sensor driving signal V21 is not a signal having a fixed potential like a ground potential, but is a periodic signal. The sensor driving signal V21 has a different voltage level from that of the touch driving signal V11 in the touch period T1.

When the sensor driving signal V21 like this is input, the base electrode BE enters a state where the electric field is oscillated by a periodic signal over the entire surface. Namely, the base electrode BE is similarly oscillated by a periodic signal for not only a region facing the sensor electrode SE selected as a detection target by being connected to the detector DET but also a region facing the sensor electrode SE not selected as a detection target. On the other hand, in the sensor electrode section 4, the one sensor electrode SE in each of the blocks and the detector DET are connected to each other through the circuit 600 in the multiplexer MUX for each of the detection periods T3. At this time, the remaining sensor electrodes SE and the detector DET remain unconnected.

The sensor driving signal V21 applied to the base electrode BE is transmitted to the sensor electrode SE through the first capacitance C1, and is then output as the sensor detection signal V22 from the sensor electrode SE. The sensor detection signal V22 is a periodic signal corresponding to the sensor driving signal V21. The detector DET detects the detection signal Vdet2 based on the sensor detection signal V22. A waveform 1004 corresponds to the sensor detection signal V22. In FIG. 10, detection is sequentially performed even in the force period T2 like in the touch period T1, and the detection signal Vdet2 is obtained for each of (m+1) periods t1 to t(m+1).

By the time-division method described above, it is possible to suppress an influence of the force signal when the finger signal is desired to be detected from the detection signal, and it is possible to suppress an influence of the finger signal when the force signal is desired to be detected. Therefore, it is possible to improve the touch sensing accuracy and the force sensing accuracy. Further, in the first embodiment, the number of detectors DET is made smaller than the number of sensor electrodes SE in the sensor electrode section 4. As illustrated in FIG. 6, the number (z+1) of detectors DET is made to match the number (n+1) of columns of the sensor electrodes SE. Also, as illustrated in FIG. 10, driving and detection of the sensor electrode section 4 are sequentially performed in units of rows. Thus, the number of components such as the detectors DET and the circuit mounting area can be reduced, so that costs can be reduced. Since the detector DET and others are shared between the touch sensing and the force sensing, the number of components and the like can be suppressed.

Note that the following modification example is also possible. Namely, the order of the touch period T1 and the force period T2 may be reversed. Each of the touch period T1 and the force period T2 may be constituted of a plurality of periods. For example, the order may be a first touch period, a first force period, a second touch period, and a second force period.

The driving and the detection of the sensor electrode section 4 are not limited to those in the foregoing example. For example, the method in which the sensor electrodes SE are sequentially detected for each of the columns is also possible. Alternatively, the plurality of detectors DET may be provided in a one-to-one manner for each of the sensor electrodes SE. In the case, the signals from all the plurality of sensor electrodes SE in the sensor electrode section 4 can be detected at a small number of timings, for example, at one timing. In other words, the detection period of time can be shortened instead of increasing the number of required detectors DET.

[Signal in Touch Period T1]

Figure 11:
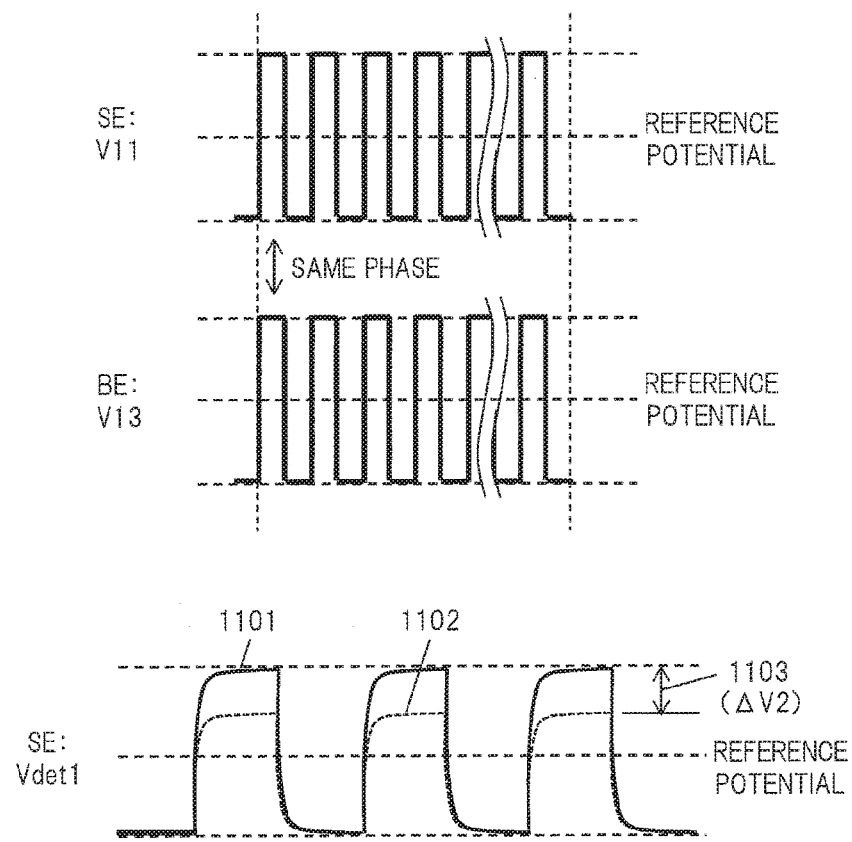
FIG. 11 illustrates a signal waveform in a touch period in the display device according to the first embodiment.

FIG. 11 illustrates an example of waveforms of the driving signal and the detection signal in the touch period T1 in the timing chart. FIG. 11 illustrates the touch driving signal V11 to the sensor electrode SE, the protection signal V13 to the base electrode BE, and the detection signal Vdet1 based on the touch signal V12 from the sensor electrode SE in this order from above. Note that an ideal rectangular wave is illustrated as the driving signal, but an actual waveform contains dull due to circuit propagation as indicated by the detection signal.

The touch driving signal V11 has a rectangular waveform as a periodic signal, and has positive and negative voltage levels with respect to a reference potential. The protection signal V13 is a driving signal for protecting the touch driving signal V11 and the touch signal V12. The protection signal V13 has the same rectangular waveform as that of the touch driving signal V11, and has the same phase as that of the touch driving signal V11. Note that waveforms of periodic signals such as the touch driving signal V11 and the protection signal V13 are not limited to the rectangular waveform, and the waveform may be a sinusoidal waveform or a triangular waveform.

If the base electrode BE is fixed to a ground potential like the ground electrode GE in the comparative example, the second capacitance C2 is greatly affected by the first capacitance C1, and influence of noise on the second capacitance C2 is large. Thus, not only a component corresponding to the second capacitance C2 but also a component corresponding to the first capacitance C1 is likely to be included in the detection signal Vdet1.

On the other hand, in the first embodiment, the circuit section applies periodic signals having the same phase as the touch driving signal V11 and the protection signal V13 to the sensor electrode SE and the base electrode BE at synchronous timings. Thus, at the time of touch sensing, the protection function of suppressing the mutual influence of the first capacitance C1 on the second capacitance C2, suppressing the influence of noise on the second capacitance C2, and stabilizing the touch sensing is implemented. Accordingly, the detection signal Vdet1 is less likely to include the component corresponding to the first capacitance C1, and the finger signal corresponding to the second capacitance C2 can be easily detected separately. Namely, the touch sensing accuracy can be enhanced.

In the waveform of the detection signal Vdet1, a pulse 1101 represents a pulse at the time when touch is absent. The pulse 1101 has a voltage level corresponding to a capacitance value C2a of the second capacitance C2. A pulse 1102 represents a pulse at the time when touch is present. The pulse 1102 has a voltage level corresponding to a capacitance value (C2a+ΔC2) on which a capacitance difference value ΔC2 of the second capacitance C2 is reflected. A voltage difference value 1103 represents a voltage difference value ΔV2 corresponding to the capacitance difference value ΔC2.

The detection circuit compares the voltage difference value ΔV2 with a threshold value based on the detection signal Vdet1, for example, and determines that touch is present when the voltage difference value ΔV2 exceeds the threshold value. The detection circuit calculates coordinates of touch position corresponding to a pixel within the screen 102 based on a position of the sensor electrode SE at which the presence of touch is determined.

[Signal in Force Period T2]

Figure 12:
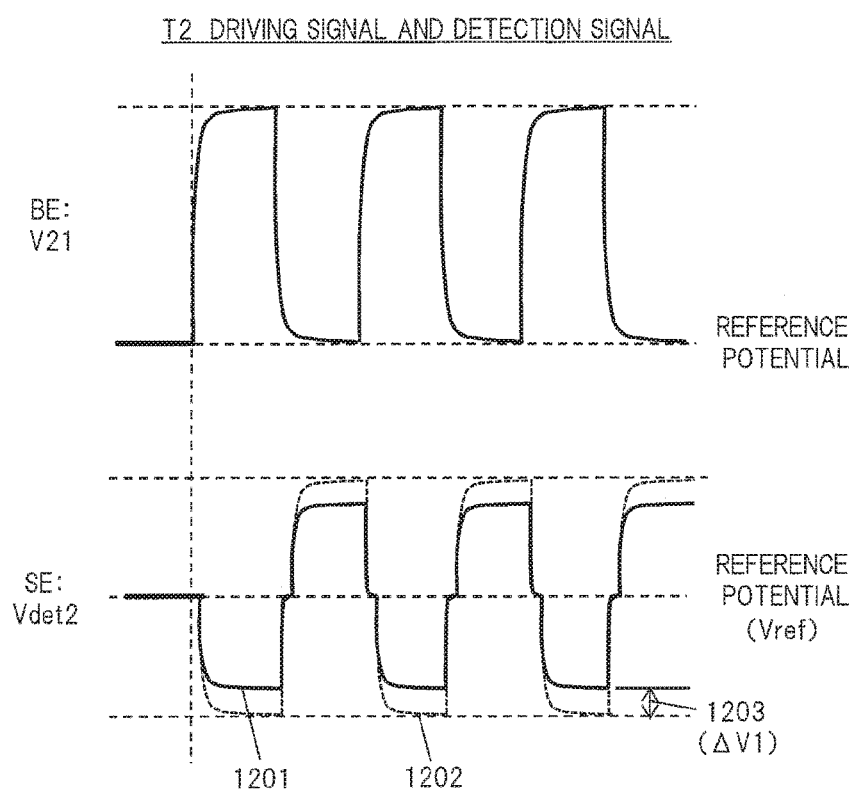
FIG. 12 illustrates a signal waveform in a force period in the display device according to the first embodiment.

FIG. 12 illustrates an example of waveforms of the driving signal and the detection signal in the force period T2 in the timing chart. FIG. 12 illustrates waveforms containing dull. FIG. 12 illustrates the sensor driving signal V21 to the base electrode BE and the detection signal Vdet2 based on the sensor detection signal V22 from the sensor electrode SE.

The waveform of the sensor driving signal V21 is a rectangular waveform as a periodic signal which varies between a reference potential and a predetermined positive potential.

The waveform of the detection signal Vdet2 based on the sensor detection signal V22 is a waveform of a periodic signal which varies to be reversed between positive and negative potentials with the reference potential as its center. The reference potential is a positive potential based on the reference voltage signal Vref. Note that the configuration in which the reference potential is set to a ground potential is also possible.

In the waveform of the detection signal Vdet2, a pulse 1201 represents a pulse at the time when press is absent. The pulse 1201 has a voltage level corresponding to a capacitance value C1a of the first capacitance C1. A pulse 1202 represents a pulse at the time when press is present. The pulse 1202 has a voltage level corresponding to a capacitance value (C1a+ΔC1) on which a capacitance difference value ΔC1 of the first capacitance C1 is reflected. In the state where press is present, a distance in the Z-direction between the sensor electrode SE and the base electrode BE becomes short, so that the capacitance value of the first capacitance C1 increases. Accordingly, a voltage level of the detection signal Vdet2 increases like the pulse 1202.

A voltage difference value 1203 corresponds to a voltage difference value ΔV1 between the pulse 1201 and the pulse 1202. The voltage difference value ΔV1 has a predetermined relationship with the capacitance difference value ΔC1. The detection circuit calculates a pressing force based on a relational expression among a voltage, a capacitance, and the pressing force from the voltage difference value ΔV1 based on the detection signal Vdet2, for example.

[Touch Period T1]

Figure 13:
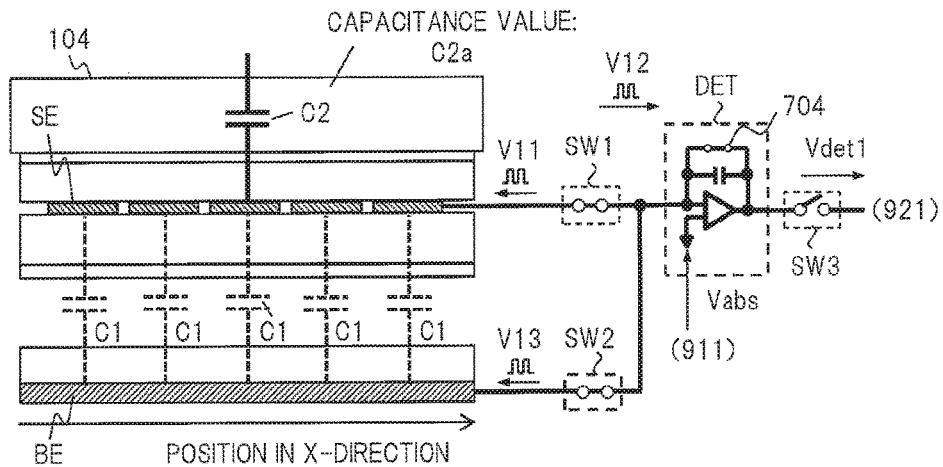
FIG. 13 illustrates a state of absence of finger touch for self capacitance touch sensing in the touch period in the display device according to the first embodiment.
Figure 14:
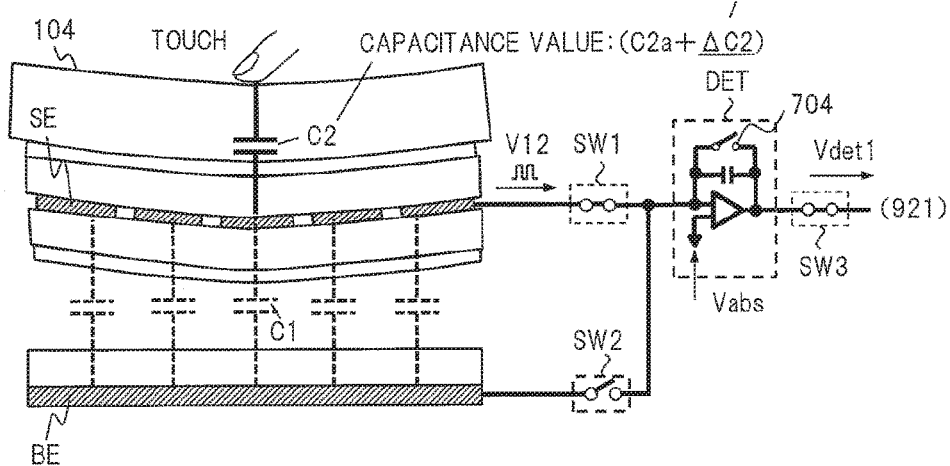
FIG. 14 illustrates a state of presence of finger touch for self capacitance touch sensing in the touch period in the display device according to the first embodiment.

FIGS. 13 and 14 illustrate constituent parts of the touch sensing function of the main body section 10 and the self capacitance touch sensing in the touch period T1. FIG. 13 illustrates the state of absence of finger touch, and FIG. 14 illustrates the state of presence of finger touch. In the state illustrated in FIG. 13, a finger does not come closer to and come in contact with the upper surface 104 corresponding to the screen 102. The capacitance value C2a corresponding to the state of absence of finger touch is stored in the second capacitance C2 of the sensor electrode SE. The touch signal V12 becomes a voltage signal corresponding to the capacitance value C2a.

In the state illustrated in FIG. 14, a finger comes closer to or comes in contact with the upper surface 104. In the course of change from FIG. 13 to FIG. 14, the capacitance value of the second capacitance C2 increases due to the influence of the capacitance of the finger. The capacitance difference value of the change of the second capacitance C2 is defined as ΔC2. In this state, the capacitance value of the second capacitance C2 is (C2a+ΔC2). The touch signal V12 becomes a voltage signal corresponding to the capacitance value (C2a+ΔC2).

The circuit section repeats application of the touch driving signal V11 to the sensor electrode SE and detection of the touch signal V12 from the sensor electrode SE alternately in terms of time based on switching of a circuit connected state in the touch period T1.

The circuit section applies the touch driving signal V11 to the sensor electrode SE to charge the second capacitance C2. At this time, the circuit section turns on the switch SW11 illustrated in FIG. 9, turns on the switch SW1 and the switch SW2, turns off the switch SW3 and the switch SW4, and turns on the switch 704 in the detector DET at a predetermined timing and in a predetermined order. The driving voltage signal Vabs is input as a reference voltage signal to the positive input terminal of the integrator 701. The integrator 701 is brought into the aforementioned imaginary short state. Thus, the touch driving signal V11 is applied to the sensor electrode SE through the detector DET based on the driving voltage signal Vabs. In addition, the protection signal V13 is applied to the base electrode BE through the detector DET based on the driving voltage signal Vabs at the same time as the application of the touch driving signal V11.

The circuit section applies the touch driving signal V11 to the sensor electrode SE, and then turns off the switch SW1 and the switch SW2 and temporarily brings the sensor electrode SE and the base electrode BE into an electrically floating state. Next, the circuit section detects the touch signal V12 from the sensor electrode SE to discharge the second capacitance C2. The detector DET outputs the detection signal Vdet1 based on the touch signal V12. At this time, the circuit section turns off the switch 704 and turns on the switch SW1. Thus, the touch signal V12 from the sensor electrode SE is input to the negative input terminal of the integrator 701. A current corresponding to the capacitance value of the second capacitance C2 flows into the detector DET from the sensor electrode SE, and is stored as a capacitance in the capacitive element 702.

Thereafter, the circuit section turns off the switch SW1 and the switch SW2, turns on the switch SW3, and turns on the switch 704. Thus, the detector DET detects variations of a capacitance and a voltage as the detection signal Vdet1. In the integrator 701, a current corresponding to the capacitance of the capacitive element 702 is integrated and converted into a voltage, and is output as the detection signal Vdet1 from the output terminal. The detection signal Vdet1 corresponds to the aforementioned finger signal. The detection signal Vdet1 is input to the touch sensing circuit section 921 through the switch SW3. The touch sensing circuit section 921 calculates coordinates of touch position and the like by using the detection signal Vdet1 based on the voltage difference value ΔV2 corresponding to the capacitance difference value ΔC2 as illustrated in FIG. 14, and outputs the touch sensing signal 301.

As described above, in the touch period T1, the finger signal can be mainly separately detected in the detection signal Vdet1 while suppressing the influence of the first capacitance C1 on the second capacitance C2 by the time-division method, the protection signal V13, and the like.

[Force Period T2]

FIGS. 15 and 16 illustrate constituent parts of the force sensing function of the main body section 10 and the mutual capacitance force sensing in the force period T2. FIG. 15 illustrates the state of absence of finger press, and FIG. 16 illustrates the state of presence of finger press. In the state illustrated in FIG. 15, the upper surface 104 is not pressed by finger touch. In this state, a capacitance value of the first capacitance C1 is defined as C1a. Also, a predetermined distance between the sensor electrode SE and the base electrode BE including a distance of the gap section 7 in the Z-direction is defined as d0.

In the state illustrated in FIG. 16, the upper surface 104 is pressed. A pressing force, in other words, a load is applied to a point corresponding to a position where the upper surface 104 is touched with a finger. With this pressing force, the display section 20 and the gap section 7 are elastically deformed in the Z-direction, and are bent in the X-Y plane with the pressing point as its center. Respective positions of the backlight section 8 and the base electrode section 9 do not change. Thus, the distance between the sensor electrode SE and the base electrode BE changes in the Z-direction. The distance between the sensor electrode SE and the base electrode BE including the distance of the gap section 7 in the Z-direction changes from d0 to d1. In the X-Y plane, the distance d1 has a distribution depending on the position of the sensor electrode SE. This distance distribution has a predetermined relationship with a capacitance distribution and a pressing force distribution. The capacitance value of the first capacitance C1 also changes depending on the distance change In the change from FIG. 15 to FIG. 16, the capacitance difference value of the change of the first capacitance C1 is defined as ΔC1. In this state, the capacitance value of the first capacitance C1 is (C1a+ΔC1). In the X-Y plane, the capacitance value of the first capacitance C1 has a distribution depending on the position of the sensor electrode SE.

The circuit section supplies the sensor driving signal V21 to the base electrode BE in the force period T2. At this time, the circuit section turns on the switch SW13, and supplies the sensor driving signal V21 from the sensor driving signal circuit section 913 to the base electrode BE. The sensor driving signal V21 supplied to the base electrode BE is transmitted to the sensor electrode SE through the first capacitance C1. The sensor detection signal V22 based on the sensor driving signal V21 is output from the sensor electrode SE, and the detection circuit receives the sensor detection signal V22. The sensor detection signal V22 is a voltage signal mainly representing the capacitance value of the first capacitance C1.

At this time, the circuit section turns on the switch SW1, and turns off the switch 704 in the detector DET. Thus, the sensor detection signal V22 is input to the negative input terminal of the integrator 701 in the detector DET. A current corresponding to the capacitance value of the first capacitance C1 flows to the detector DET, and a capacitance is stored in the capacitive element 702. Then, the circuit section turns off the switch SW1, turns on the switch SW4, and turns on the switch 704. Accordingly, in the integrator 701, a current corresponding to the capacitance of the capacitive element 702 is integrated and converted into a voltage, and is output as the detection signal Vdet2 from the output terminal. The detection signal Vdet2 corresponds to the aforementioned force signal. The detection signal Vdet2 is input to the force sensing circuit 922 through the switch SW4.

The force sensing circuit section 922 detects a voltage difference value ΔV1 corresponding to the capacitance difference value ΔC1 of the first capacitance C1 illustrated in FIG. 16 based on the detection signal Vdet2, and calculates the pressing force based on the voltage difference value ΔV1. The force sensing circuit section 922 calculates the pressing force from the voltage difference value ΔV1 in consideration of the distribution of the distance, the capacitance, and the pressing force in the X-Y plane of the main body section 10.

Note that the force sensing function is not limited to the sensing of the pressing force, and the function of sensing the presence or absence of a predetermined pressing force in a binary manner is also possible. In the case, for example, the force sensing circuit section 922 compares the detected voltage value or pressing force with a threshold value, and determines whether the voltage value or the pressing force exceeds the threshold value.

As described above, in the force period T2, the force signal can be mainly separately detected in the detection signal Vdet2 while suppressing the influence of the second capacitance C2 on the first capacitance C1 by the time-division method, the mutual capacitance sensing, the separation function of the sensor electrode section 4 and the like.

[Details of Force Sensing]

As details of the force sensing function, for example, a relationship among a capacitance, a voltage, and a pressing force and calculation of the pressing force in the detection circuit will be described. In addition, an example of a characteristic of the main body section 10 associated with the force sensing will be described. In the detection circuit, the pressing force can be calculated from the detection signal based on a relational expression among the capacitance, the voltage, and the pressing force. The relational expression can be defined based on known physics. In addition, the relational expression can be defined based on the characteristic of the main body section 10. The characteristic of the main body section 10 can also be previously measured by an experiment.

In the detection circuit, the capacitance difference value associated with the sensor electrode SE can be obtained from the voltage difference value indicated by the detection signal Vdet based on the relational expression. In the detection circuit, the pressing force can be obtained from the voltage difference value or the capacitance difference value based on the relational expression. In addition, a relationship of an output pressing force with an input voltage value may be previously defined as a typical value in a table. Thus, in the detection circuit, the pressing force can be obtained based on the table while omitting intermediate calculations.

Figure 17:
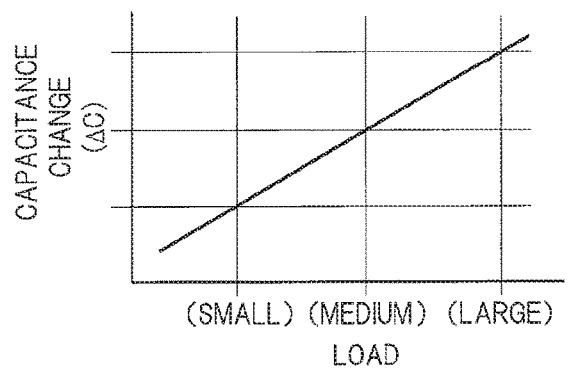
FIG. 17 illustrates a case where a relationship between a change in capacitance and a load associated with force sensing is linear as an example in the display device according to the first embodiment.
Figure 18:
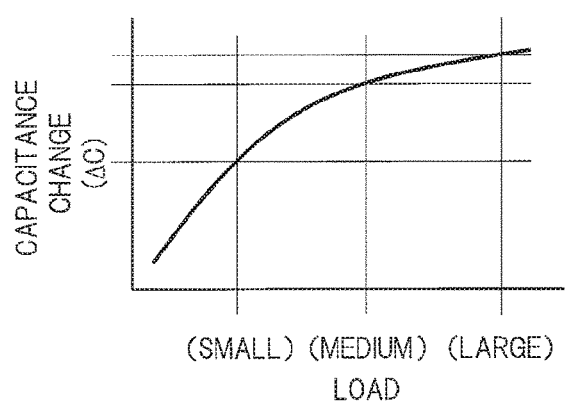
FIG. 18 illustrates a case where a relationship between a change in capacitance and a load associated with force sensing is nonlinear as an example in the display device according to the first embodiment.

FIGS. 17 and 18 illustrate a relationship between the capacitance difference value $\Delta C$ corresponding to the capacitance change and the load corresponding to the pressing force onto the screen 102 with a finger with respect to the characteristic of the main body section 10 associated with the force sensing. The load mentioned here means a force applied to a pressing point of the screen 102. The pressing force is a force applied per unit area.

FIG. 17 illustrates a case where the relationship is linear and is indicated by a straight line. As the load increases in the order of a small load, a medium load, and a large load, the capacitance difference value $\Delta C$ corresponding to the capacitance change linearly increases. In such a relationship, the detection circuit can obtain the pressing force based on the linear relational expression from the capacitance difference value $\Delta C$ indicated by the detection signal. The relationship corresponding to the characteristic of the main body section 10 is not necessarily linear.

FIG. 18 illustrates a case where the relationship is nonlinear and is indicated by, for example, a quadratic curve. As the load increases in the order of a small load, a medium load, and a large load, the capacitance difference value $\Delta C$ nonlinearly increases. For example, a slope of the increase of the capacitance difference value $\Delta C$ is large in a place where the load increases from the small load to the medium load, and the slope is small in a place where the load increases from the medium load to the large load. Even in such a relationship, the detection circuit can obtain the pressing force based on the nonlinear relational expression from the capacitance difference value $\Delta C$ indicated by the detection signal.

The aforementioned relationship is one example, and changes depending on the characteristic of the main body section 10. The main body section 10 has a characteristic relating to elastic deformation at the time of press depending on the mounting structure, and accordingly has a characteristic relating to a capacitance change. The aforementioned characteristic and relationship may change depending on the position of the sensor electrode SE in the X-Y plane corresponding to the screen 102. For example, the change amounts of the distance, the capacitance, and the voltage with respect to the pressing load may differ between a central position of the screen 102 and a position close to the frame section 103. Namely, the aforementioned distributions are provided in the X-Y plane. The detection circuit is designed based on the characteristic of the main body section 10 including the aforementioned distributions in the X-Y plane, and performs the processing for the force sensing and the touch sensing based on the relational expression corresponding to the characteristic.

[Example of Control According to Force Sensing]

The display device can perform various types of control by using force sensing information such as the sensed pressing force as input information or control information. An example in which control is performed by using the pressing force of the force sensing signal 302 within the display device will be described below. More specifically, an example in which processing for controlling a graphical user interface in the screen 102 serving as a touch panel is performed depending on the pressing force will be described. The control circuit section 151 performs processing for controlling an object such as an icon within the screen 102 depending on a pressing force and its change detected by respective operations of touching and pressing the screen 102.

It is assumed that three levels, that is, a small level, a medium level, and a large level are distinctively determined as the pressing force. The following is an example of three types of control in the case where a long tap or the like on an object within the screen 102 is performed, as an example of first control processing. The first control in the case where the pressing force is small is object movement. The second control in the case where the pressing force is medium is sub-menu display relating to the object. The third control in the case where the pressing force is large is object determination.

The following is an example of three types of control for controlling an enlargement and reduction speed in the case where an operation such as a pinch for enlarging and reducing an object within the screen 102 is performed, as an example of second control processing. The enlargement and reduction speed is set to a relatively low first speed in the first control in the case where the pressing force is small, the enlargement and reduction speed is set to a relatively medium second speed in the second control in the case where the pressing force is medium, and the enlargement and reduction speed is set to a relatively high third speed in the third control in the case where the pressing force is large.

Similarly, the display device can perform predetermined control processing by using the touch position information of the touch sensing signal 301 as input information.

[Effect and Others]

As described above, by the display device and the display method according to the first embodiment, components of the detection signal can be separately detected by the time-division method and the like while suppressing the mutual influence of the first capacitance C1 and the second capacitance C2, and the force sensing accuracy and the touch sensing accuracy can be improved. The display device can obtain highly accurate force sensing information and touch sensing information, and can perform appropriate control by using the information.

Some additional descriptions will be provided for the distance between the sensor electrode SE and the base electrode BE. From the viewpoint of force sensing accuracy, a distance change in the Z-direction caused by elastic deformation of the display section 20 is preferably large because the change amount of the first capacitance C1 becomes large and noise resistance becomes high. Therefore, in the first embodiment, the sensor electrode SE and the base electrode BE are not arranged at positions close to each other but are arranged at positions spaced relatively farther away from each other with the gap section 7 and the like interposed therebetween, as illustrated in FIG. 2. The sensor electrode section 4 on the one side is formed within the display section 20, while the base electrode section 9 on the other side is formed in the backlight section 8 outside the display section 20. Thus, the force sensing accuracy can be made relatively high.

The following is also possible as a modification example to the first embodiment. For example, the base electrode section 9 does not necessarily have a single plate shape but may be composed of a plurality of base electrodes BE. For example, a plurality of base electrodes BE having a predetermined shape such as a linear shape or a rectangular shape may be arranged in the X-Y plane corresponding to the screen 102. Also, the circuit section may apply the same signal to the base electrodes BE or apply a signal to the selected base electrode BE.

Second Embodiment

A display device and a display method according to a second embodiment of the present invention will be described below with reference to FIGS. 19 and 20. The second embodiment is a modification example to the first embodiment, and mainly differs from the first embodiment in circuit configuration.

The characteristic of elastic deformation of the main body section 10 by press described above does not steeply change but gently changes at the positions of the adjacent sensor electrodes SE in the distribution of the distance, the capacitance and the like in the X-Y plane. Therefore, in this distribution, even if a region of the sensor electrode SE for obtaining one detection signal in one detection is made larger in the force sensing than in the touch sensing, the pressing force can be sensed with sufficiently high accuracy.

Thus, in the display device and the display method according to the second embodiment, the region of the sensor electrode SE for obtaining one detection signal in one detection in the force period T2 relative to that in the touch period T1 is made larger in comparison to the first embodiment. More specifically, one sensor electrode SE is set as one unit region in the touch period T1, and a predetermined number of sensor electrodes SE as one block are set as one unit region in the force period T2. Resolution for touch sensing and resolution for force sensing in the screen 102 are made different from each other. In the touch period T1, the touch sensing is performed in a relatively small size so as to detect coordinates of touch position and others as finely as possible. On the other hand, in the force period T2, the force sensing is performed in units of block having a size sufficient to sense a pressing force.

In the second embodiment, physical shapes of the sensor electrode section 4 and the base electrode section 9 are the same as those in the first embodiment. In the second embodiment, the configuration of the touch period T1 is the same as that in the first embodiment, and a signal is detected in units of each sensor electrode SE. In the second embodiment, in the force period T2, a predetermined number of sensor electrodes SE, for example, four sensor electrodes SE are bundled as one block, and a signal is detected in units of the block. One detector DET receives an input of the signal in units of the block, and detects one detection signal Vdet. Thus, a detection period of time required in the force period T2 can be shortened.

[Sensor Electrode and Detection Circuit]

Figure 19:
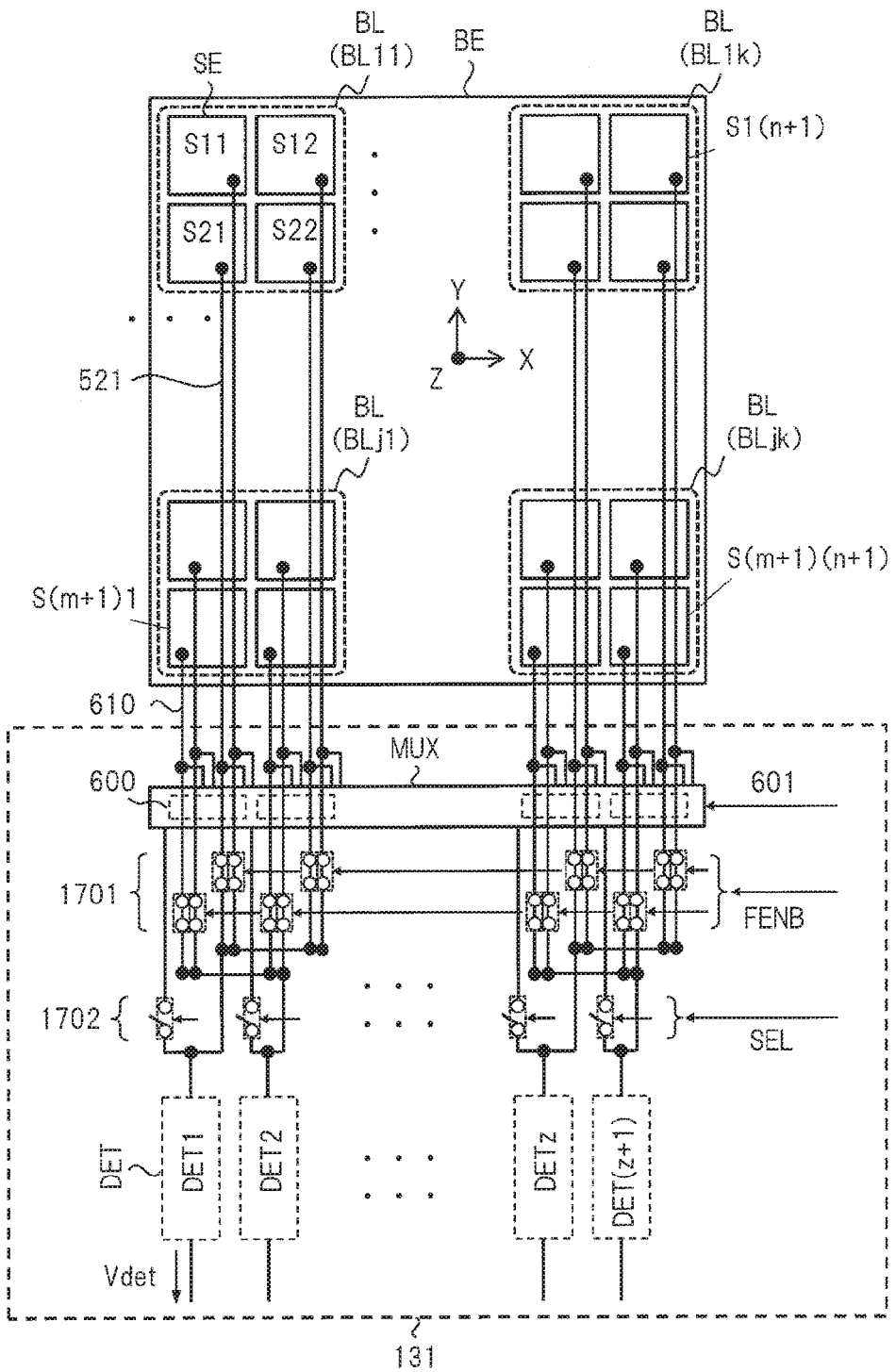
FIG. 19 illustrates a configuration of an electrode section and a circuit section in a display device according to a second embodiment of the present invention.

FIG. 19 illustrates a configuration of the sensor electrode section 4, the detection circuit and the like associated with the force sensing in the display device according to the second embodiment. Illustrations of the base electrode circuit section 132 and the like are omitted. The configuration of the matrix of the plurality of sensor electrodes SE in the sensor electrode section 4 is the same as that illustrated in FIGS. 1 and 6. Further, the configuration of the plurality of detectors DET in the sensor electrode circuit section 131 is approximately the same as that illustrated in FIG. 6.

In the second embodiment, a block BL relating to the sensor electrodes SE is provided. A total of four sensor electrodes SE including two sensor electrodes SE adjacent in the X-direction and two sensor electrodes SE adjacent in the Y-direction are taken as one block BL. For example, a block BL11 includes four sensor electrodes SE {S11, S12, S21, S22}. In the region corresponding to the screen 102, a plurality of blocks BL are arranged in a matrix. In the matrix of the blocks BL, there are j block rows in the Y-direction and k block columns in the X-direction. For example, in the first block row, the blocks BL11 to BL1k are arranged in the X-direction. In the first block column, the blocks BL11 to BLj1 are arranged in the Y-direction.

The detection circuit in the sensor electrode circuit section 131 includes a switch section 1701 and a switch section 1702 in addition to the plurality of detectors DET and the multiplexer MUX similar to those in FIG. 6. The switch section 1701 and the switch section 1702 are connected between the multiplexer MUX and the plurality of detectors DET. The detection circuit selects the block BL from the sensor electrode section 4 by switching a circuit connected state by using the switch section 1701 and the switch section 1702, and inputs the signal from the selected block BL to the detector DET.

The sensor electrodes SE in each of the blocks BL are connected to the multiplexer MUX through the connection line 521 and the connection line 610 like in the first embodiment, and are respectively connected to inputs of switches in the switch section 1701 through the connection line 610. Each of the switches in the switch section 1701 is switched between an on-state and an off-state in accordance with a force sensing enable signal FBNB. The force sensing enable signal FBNB is, in other words, a control signal for selecting the block BL. When it is desired to select a certain block BL in the sensor electrode section 4, the detection circuit turns on each of the switches corresponding to the block BL by the force sensing enable signal FENB. The switch in the on-state outputs a signal from the sensor electrode SE.

The outputs of the switches in the switch section 1701 are brought together for each of the blocks BL, and are connected to the input of the detector DET. For example, signals from the four sensor electrodes SE in the block BL11 are connected to the input of the detector DET1 through the four switches.

Also, the switch section 1702 is provided between the output of the multiplexer MUX and the input of the detector DET. The signal selected by the circuit 600 in the multiplexer MUX is input to a corresponding switch in the switch section 1702 like in the first embodiment. The switch in the switch section 1702 is switched between an on-state and an off-state in accordance with a selection signal SEL input to the control terminal. When the switch is in an on-state, the signal from the multiplexer MUX is input to the detector DET.

An output of the switch in the switch section 1702 and an output of the switch in the switch section 1701 are electrically connected to the input of the detector DET. The signal from the individually selected sensor electrode SE is input to the detector DET through the switch section 1702 in the touch period T1. The signal of each block BL is input to the detector DET through the switch section 1701 as described above in the force period T2.

The detection circuit controls the force sensing in units of the block BL by applying signals such as the control signal 601, the force sensing enable signal FENB, and the selection signal SEL in the force period T2. The detection circuit turns on each of the switches in the switch section 1701 corresponding to the selected block BL and turns off the corresponding switch in the switch section 1702 in accordance with the force sensing enable signal FENB in the force period T2. Thus, the signal from the selected block BL is input to the detector DET. This signal is a voltage signal representing a capacitance change in the size of a unit region of each block BL.

In the aforementioned circuit configuration, signals from a predetermined number of blocks BL up to (z+1) blocks BL selected from a region of the screen 102 can be collectively detected by the (z+1) detectors DET at one detection timing. If the number (z+1) of detectors DET is made equal to or larger than the total number of blocks BL, the signals from all the blocks BL can be collectively detected at one detection timing.

The configuration of the block BL including the sensor electrodes SE is not limited to the foregoing. For example, any number of sensor electrodes SE such as a total of 16 (4×4) sensor electrodes SE can be set as one block BL. For example, a row of the sensor electrodes SE including (n+1) sensor electrodes SE can be set as one block BL, or a column of the sensor electrodes SE including (m+1) sensor electrodes SE can also be set as one block BL.

[Timing Chart]

Figure 20:
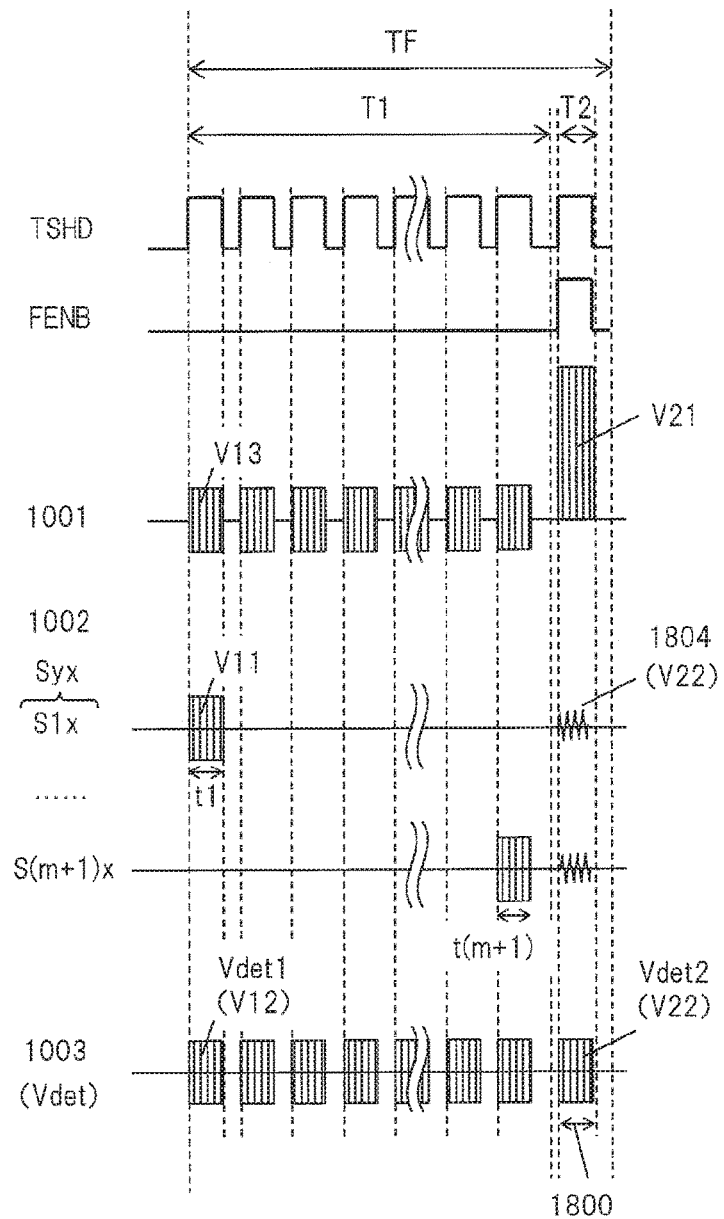
FIG. 20 illustrates a timing chart in the display device and a display method according to the second embodiment.

FIG. 20 illustrates a timing chart in the display device and the display method according to the second embodiment. The touch period T1 has the same configuration as that in the first embodiment. The force sensing enable signal FENB is brought into an off-state. The switch in the switch section 1702 is turned on, and the switch in the switch section 1701 is turned off.

In the force period T2, the force sensing enable signal FENB is brought into an on-state. The switch in the switch section 1702 is turned off, and the switch in the switch section 1701 is turned on. FIG. 20 illustrates an example in which all of the plurality of blocks BL {the block BL11, . . . , the block BLjk} in the sensor electrode section 4 illustrated in FIG. 19 are collectively selected in one timing period 1800. In this case, the number (z+1) of detectors DET is equal to or larger than the total number of blocks BL.

In the second embodiment, some of the plurality of blocks BL in the screen 102 can be simultaneously connected to the plurality of detectors DET. Each of the detectors DET simultaneously receives the sensor detection signals V22 from the plurality of sensor electrodes SE in the connected block BL as one sensor detection signal.

The present invention is not limited to this, and the number (z+1) of detectors DET may be smaller than the total number of blocks BL. In the case, the detection circuit sequentially detects all the plurality of blocks BL in the sensor electrode section 4 in a plurality of periods for each of a predetermined number of blocks BL in the force period T2 like in the control of the touch period T1 according to the first embodiment.

In the configuration according to the second embodiment, for example, the four sensor electrodes SE constitute the one block BL, so that the detection period of time associated with the force sensing can be reduced to nearly one-fourth of the detection period of time in the first embodiment. The detection period of time can be further shortened depending on a design of the number of sensor electrodes SE constituting the block BL and the number of detectors DET provided in the detection circuit.

[Effect and Others]

As described above, according to the second embodiment, the detection period of time associated with the force sensing can be shortened. The size of a detection unit region can be made different between the touch sensing and the force sensing, and touch sensing accuracy and force sensing accuracy can be appropriately adjusted. Note that more detection signals are obtained at the time of the force sensing in the first embodiment than in the second embodiment, and thus the amount of information used to calculate the pressing force can be increased in the first embodiment.

The following is also possible as a modification example to the second embodiment. As the modification example, it is also possible to perform the touch sensing by using the block BL of the sensor electrodes SE in the touch period T1. For example, the detection circuit detects only the presence or absence of touch to the screen 102 by temporarily performing the touch sensing in units of the block BL. Then, when touch is present, the detection circuit detects coordinates of the touch position by performing the touch sensing in units of the sensor electrode SE.

As a modification example, some of the plurality of sensor electrodes SE in the screen 102 may be set to non-selective electrodes so as not to be used for the sensing in the touch period T1 and the force period T2. For example, the detection circuit may alternately select the plurality of sensor electrodes SE in the screen 102 in the X-direction and Y-direction in the force period T2. Thus, the detection circuit calculates the pressing force by using a smaller number of sensor electrodes SE in the force period T2 than that in the touch period T1.

In a modification example, for example, the configuration of the block BL can be made variable by a configuration in which a switch section is further added to the circuit section. Namely, it is also possible to vary the configuration of the block BL to a first block configuration in a first situation and to another second block configuration in a second situation by the circuit section based on the control of the switch.

Other Embodiments

The following is other embodiments of the present invention. First to sixth modification examples relating to the position of the base electrode section 9 and others will be described below as modification examples to the first embodiment. In each of the modification examples, an effect similar to that in the first embodiment is obtained.

First Modification Example

Figure 21:
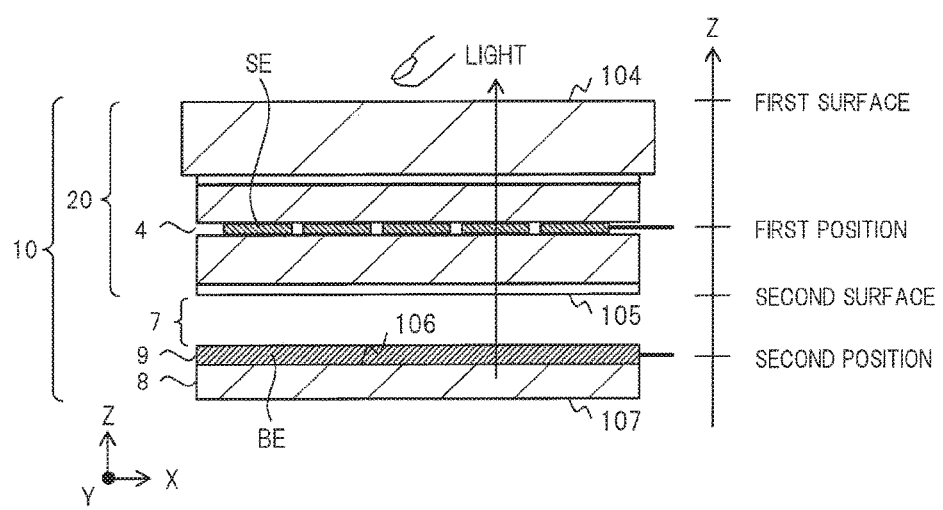
FIG. 21 illustrates a configuration of a cross section of a display device according to a first modification example to the first embodiment.

FIG. 21 illustrates a cross section in an X-Z plane of the main body section 10 in a display device in the first modification example. In the Z-direction, the base electrode section 9 may be arranged just below a hollow layer serving as the gap section 7 between the display section 20 and the backlight section 8. In the first modification example, the base electrode BE is formed on the upper surface 106 of the backlight section 8 in the Z-direction. In the backlight section 8, an outer case including the upper surface 106 has predetermined rigidity. Accordingly, the base electrode BE does not need to have rigidity. The base electrode BE can be formed by pasting a conductive film, for example. Also, the base electrode BE needs to have light transmissivity for transmitting light from the backlight section 8. Therefore, the base electrode BE is composed of, for example, ITO. In the first modification example, the second position serving as the position of the base electrode BE in the Z-direction is moved to an upper side in comparison to the second position in the first embodiment.

Second Modification Example

Figure 22:
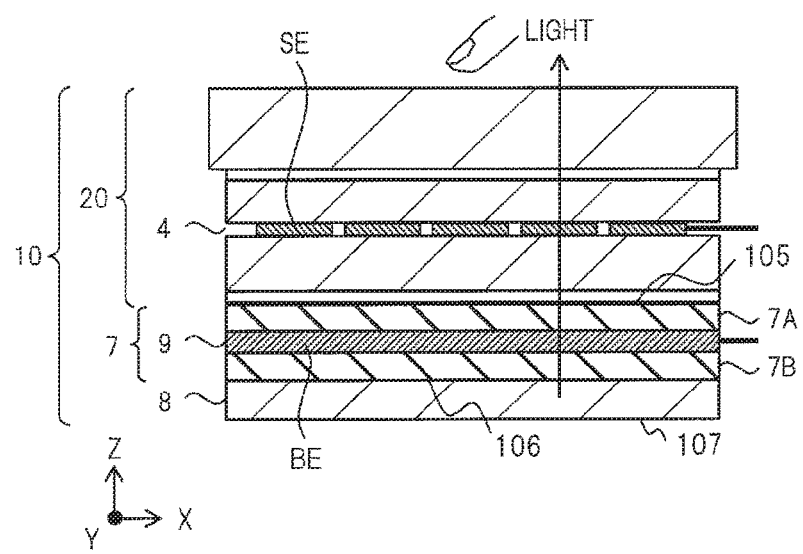
FIG. 22 illustrates a configuration of a cross section of a display device according to a second modification example to the first embodiment.

FIG. 22 illustrates a cross section in an X-Z plane of the main body section 10 in a display device in the second modification example. In the second modification example, the base electrode section 9 is provided at a position between the lower surface 105 of the display section 20 and the upper surface 106 of the backlight section 8 within the gap section 7 as the second position in the Z-direction.

Also, the gap section 7 is not limited to a hollow layer but may be a light transmissive elastic layer. In the second modification example, the base electrode BE is sandwiched between a light transmissive elastic layer 7A on the side of the display section 20 and a light transmissive elastic layer 7B on the side of the backlight section 8 in the gap section 7 and is supported by the light transmissive elastic layers 7A and 7B. If the gap section 7 is a hollow layer, ends of the base electrode section 9 in the X-direction and the Y-direction may be fixed in the frame section 103.

The light transmissive elastic layer 7A and the light transmissive elastic layer 7B are elastic layers each having light transmissivity for transmitting light from the backlight section 8, and may be composed of glass, resin, an optical film, and the like. Examples of the optical film include a prism sheet and a light dispersion sheet. The configuration in which one light transmissive elastic layer 7A is a hollow layer or the other light transmissive elastic layer 7B is a hollow layer is also possible.

Third Modification Example

Figure 23:
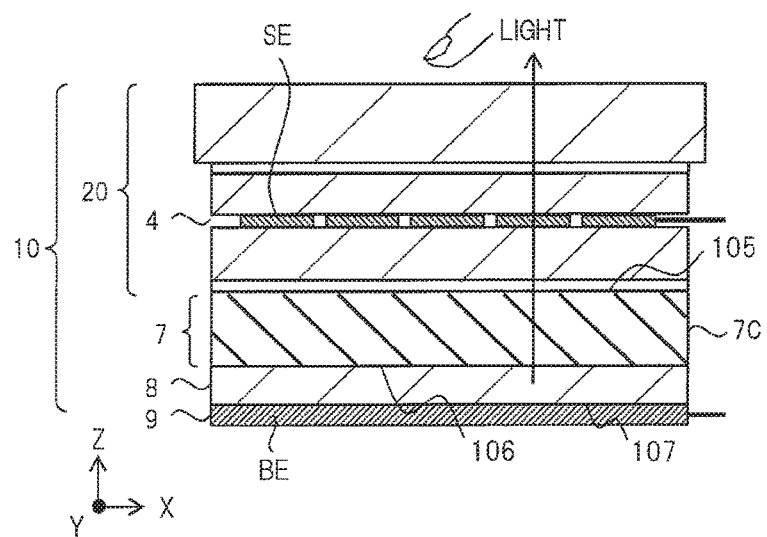
FIG. 23 illustrates a configuration of a cross section of a display device according to a third modification example to the first embodiment.

FIG. 23 illustrates a cross section in an X-Z plane of the main body section 10 in a display device in the third modification example. The gap section 7 may be provided as a light transmissive elastic layer other than a hollow layer as an elastic deformation layer. In the third modification example, the gap section 7 between the display section 20 and the backlight section 8 is composed of a light transmissive elastic layer 7C. The light transmissive elastic layer 7C is elastically deformed together with the display section 20 when the display section 20 is elastically deformed by being pressed. The light transmissive elastic layer 7C preferably has a lower modulus of elasticity than the modulus of elasticity of the display section 20 so as to be more easily elastically deformed than the display section 20. The same is true for the light transmissive elastic layer 7A and the light transmissive elastic layer 7B in the second modification example.

The base electrode section 9 is provided on the lower surface 107 of the backlight section 8 like in the first embodiment, but the base electrode section 9 may be provided on the upper surface 106 of the backlight section 8 like in the first modification example. The gap section 7 may include both a hollow layer and an elastic layer. For example, an elastic layer may be provided on the lower surface 105 of the display section 20, and a hollow layer may be provided on the upper surface 106 of the backlight section 8. Alternatively, a hollow layer may be provided on the lower surface 105 of the display section 20, and an elastic layer may be provided on the upper surface 106 of the backlight section 8.

Fourth Modification Example

Figure 24:
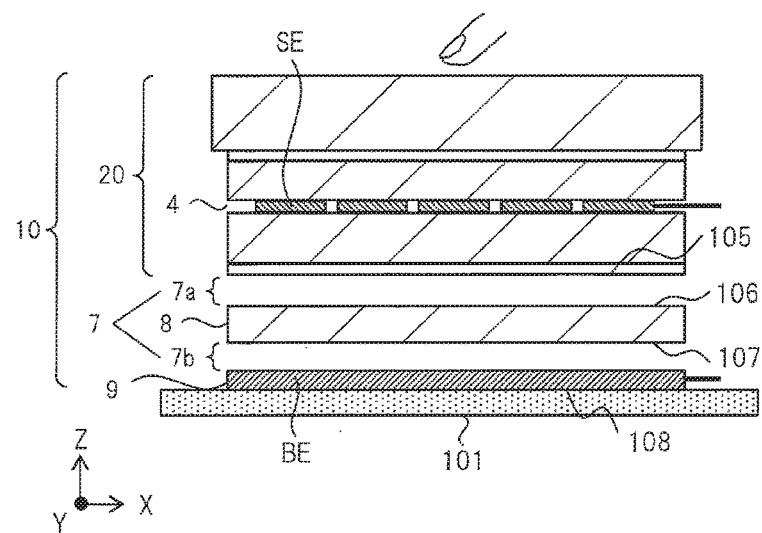
FIG. 24 illustrates a configuration of a cross section of a display device according to a fourth modification example to the first embodiment.

FIG. 24 illustrates a cross section in an X-Z plane of the main body section 10 in a display device in the fourth modification example. The base electrode section 9 may be arranged at a position further below the lower surface 107 of the backlight section 8 in the Z-direction. For example, the base electrode section 9 may be provided on the housing 101. In the fourth modification example, the base electrode BE is formed on an inner surface 108 of the housing 101. For example, the base electrode BE is formed by pasting a conductive film. Note that an insulating film or the like may be formed around the base electrode BE. The housing 101 has predetermined rigidity, and the base electrode section 9 is supported on the inner surface 108 of the housing 101. Accordingly, the base electrode section 9 does not need to have rigidity. Also, the base electrode section 9 is located below the backlight section 8, and thus does not need to have light transmissivity.

In the fourth modification example, the gap section 7 includes a gap section 7a and a gap section 7b. The gap section 7a is provided between the lower surface 105 of the display section 20 and the upper surface 106 of the backlight section 8, and the gap section 7b is provided between the lower surface 107 of the backlight section 8 and the base electrode section 9. The gap section 7a and the gap section 7b are hollow layers in this example, but they may be elastic layers.

Fifth Modification Example

Figure 25:
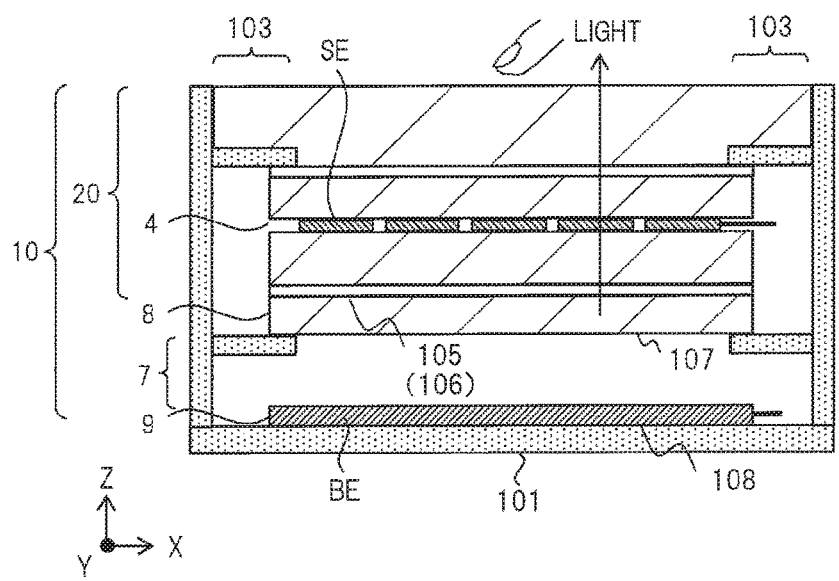
FIG. 25 illustrates a configuration of a cross section of a display device according to a fifth modification example to the first embodiment.

FIG. 25 illustrates a cross section in an X-Z plane of the main body section 10 in a display device according to the fifth modification example In the fifth modification example, the base electrode section 9 is provided on the inner surface 108 of the housing 101 as the second position in the Z-direction like in the fourth modification example. Also, in the fifth modification example, the backlight section 8 is arranged in contact with the lower surface 105 of the display section 20. The gap section 7 is provided between the lower surface 107 of the backlight section 8 and the base electrode section 9. In addition, FIG. 25 simply illustrates a structure in which the main body section 10 is fixed by the housing 101 in the vicinity of the frame section 103. Components such as the display section 20 and the backlight section 8 are physically connected by the housing 101 at their ends in the X-direction and the Y-direction, so that their positions are fixed and the gap section 7 is formed.

Sixth Modification Example

Figure 26:
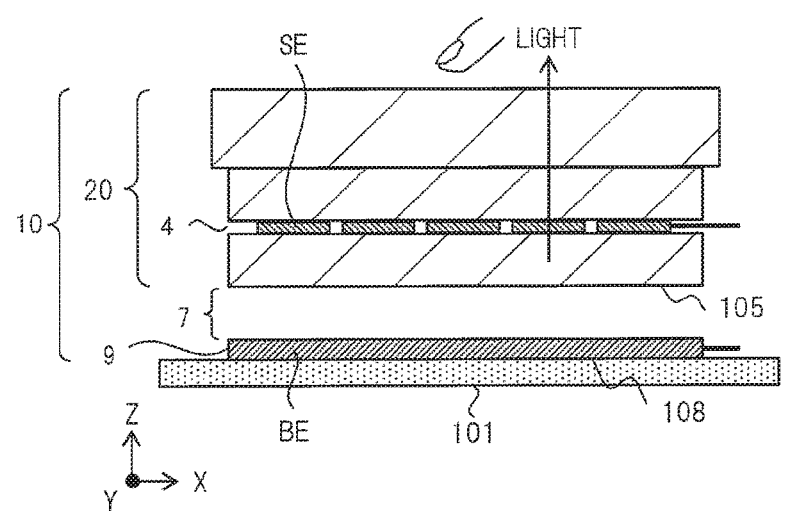
FIG. 26 illustrates a configuration of a cross section of a display device according to a sixth modification example to the first embodiment.

FIG. 26 illustrates a cross section in an X-Z plane of the main body section 10 in a display device in the sixth modification example. The display section 20 in the main body section 10 in the sixth modification example is not a liquid crystal display section but a self-luminous display section. This display section 20 is an organic EL (Electroluminescence) display section, for example. Namely, the display device in the sixth modification example is an organic EL display device. Since the display section 20 does not use the backlight section 8, the main body section 10 does not include the backlight section 8. Further, the display section 20 does not include the light polarizing plate and the liquid crystal layer described above. The display section 20 includes a light emitting element containing an organic compound as a display functional layer. In addition, as the sensor electrode SE, a plurality of cathodes formed in a square shape and arranged like tiles are adopted.

In the sixth modification example, the base electrode section 9 is provided at the second position spaced apart from and below the sensor electrode section 4 in the display device 20 in the Z-direction like in the first embodiment. In FIG. 26, the base electrode BE is provided on the inner surface 108 of the housing 101 with the gap section 7 interposed between the lower surface 105 of the display section 20 and the base electrode BE.

A person having an ordinary skill in the art can make various modification examples and correction examples within a scope of the idea of the present invention, and it is interpreted that the modification examples and the correction examples also belong to the scope of the present invention. For example, the examples obtained by performing addition or elimination of components or design change or the examples obtained by performing addition or reduction of process or condition change to the embodiments described above by a person having an ordinary skill in the art are also included in the scope of the present invention as long as they include the gist of the present invention. Although a liquid crystal display has been described as a disclosure example in the aforementioned embodiments, the present invention is not limited to this, and the present invention is applicable to, for example, an organic EL display device, other self-luminous display devices, an electronic paper display device, and a flat panel display device. Further, the present invention is applicable to small-sized to large-sized devices without particular limitations.

What is claimed is:

1. A display device comprising:
    a display section including a screen and a first electrode section which is provided at a first position in a thickness direction intersecting the screen so as to face the screen;
    a second electrode section which is provided at a second position farther away from the screen than the first electrode section in the thickness direction so as to face the first electrode section and face the screen through the first electrode section;
    a gap section which is provided between the first electrode section and the second electrode section and is deformable in the thickness direction when the screen is pressed; and
    a circuit section which is connected to the first electrode section and the second electrode section, displays to the screen, and detects a press onto the screen,
    wherein a capacitance value of a first capacitance between the first electrode section and the second electrode section is changeable due to deformation of the gap section,
    the circuit section applies a sensor driving signal to the second electrode section, and detects a sensor detection signal based on the sensor driving signal through the first capacitance,
    the display section has a plurality of pixels to be arranged in a matrix, and each of the pixels includes a pixel electrode,
    the first electrode section has a plurality of first electrodes, and the first electrodes are arranged in a matrix on a plane at the first position,
    the first electrodes are arranged side by side in a first direction parallel to the screen and a second direction intersecting the first direction, and each of the first electrodes is provided opposite the pixel electrodes, and
        a distance of a gap between two adjacent first electrodes of the first electrodes is not more than a width of each of the pixels or a distance of an arrangement pitch of each of the pixel electrodes.

2. The display device according to claim 1, wherein the circuit section calculates a pressing force corresponding to a state of the press onto the screen based on the change of the first capacitance and outputs a force sensing signal including the pressing force.

3. The display device according to claim 1, wherein the circuit section applies a touch driving signal to the first electrode section, detects a change of a second capacitance between the first electrode section and an external object touching the screen, calculates presence or absence of the touch and coordinates of a touch position corresponding to a state of the touch based on the change of the second capacitance, and outputs a touch sensing signal including the presence or absence of the touch and the coordinates of the touch position.

4. The display device according to claim 1, wherein a force period in which the press is sensed is provided, and
    the circuit section supplies the sensor driving signal to the second electrode section and receives the sensor detection signal from the first electrode section in the force period.

5. The display device according to claim 3, wherein a touch period in which the touch is sensed is provided, and
    the circuit section applies the touch driving signal to the first electrode section and detects the touch signal from the first electrode section in the touch period.

6. The display device according to claim 3, wherein a time-division period includes a touch period in which the touch is sensed and a force period in which the press is sensed, and
    the circuit section applies the touch driving signal to the first electrode section and detects the touch signal from the first electrode section in the touch period, and supplies the sensor driving signal to the second electrode section and receives the sensor detection signal from the first electrode section in the force period.

7. The display device according to claim 5,
wherein the circuit section applies a periodic signal as the touch driving signal to the first electrode section and applies a periodic signal having the same phase as that of the touch driving signal to the second electrode section in the touch period.

8. The display device according to claim 6,
wherein a display period in which display is performed on the screen is provided,
a sensing period in which the touch is sensed and the display period are alternately provided in the touch period, and
a sensing period in which the press is sensed and the display period are alternately provided in the force period.

9. The display device according to claim 1, further comprising:
a backlight section which supplies light to the display section,
wherein the second position is on a lower surface of the back light section located farther from the first position or on an upper surface of the backlight section located closer to the first position.

10. The display device according to claim 1, further comprising:
a housing which stores the display section and the second electrode section,
wherein the second position is on an inner surface of the housing.

11. The display device according to claim 1,
wherein the gap section is formed as a hollow layer.

12. The display device according to claim 1,
wherein the gap section has an elastic layer.

13. The display device according to claim 1,
wherein the first electrode section has a plurality of first electrodes, and includes a plurality of first electrode blocks constituted of some of the plurality of first electrodes,
the circuit section includes a plurality of detectors provided to correspond to the plurality of first electrode blocks,
each of the first electrode blocks in the first electrode section is electrically connected to each of the detectors through a connection line and a circuit including a multiplexer, and
each of the plurality of detectors sequentially receives the sensor detection signals from each of some of the first electrodes in the first electrode block connected through the connection line and the circuit.

14. The display device according to claim 1,
wherein the first electrode section has a plurality of first electrodes, and includes a plurality of first electrode blocks constituted of some of the plurality of first electrodes,
the circuit section includes a plurality of detectors provided to correspond to the plurality of first electrode blocks,
each of the first electrode blocks in the first electrode section is electrically connected to each of the detectors through a connection line and a circuit including a multiplexer, and
each of the plurality of detectors simultaneously receives the sensor detection signals from some of the first electrodes in the first electrode block as one signal connected through the connection line and the circuit.

15. The display device according to claim 1,
wherein the display section includes the pixel electrode provided for each of the pixels in the screen, a scanning line for selecting the pixel, and a signal line for controlling a state of display of the pixel,
the circuit section applies a scanning signal to the scanning line, applies a display signal to the signal line, and applies a common voltage signal to the first electrode section when display is performed on the screen, and
the pixel electrodes are arranged between the first electrode section and the screen, and the distance of the gap between the two adjacent first electrodes is not more than the distance of the arrangement pitch of each of the pixel electrodes.

16. The display device according to claim 1,
wherein the circuit section has a plurality of detectors provided correspondingly to the first electrodes,
each of the first electrodes in the first electrode section is electrically connected to each of the detectors through a connection line and a circuit including a multiplexer, and
each of the detectors sequentially receives, for each of the first electrodes, the sensor detection signal from each of some of the first electrodes connected through the connection line and the circuit.

17. A display method for performing force sensing and touch sensing on a screen of a display device,
wherein a time-division period includes a touch period in which the touch sensing is performed and a force period in which the force sensing is performed,
the display device includes: a display section including a screen and a first electrode section which is provided at a first position in a thickness direction intersecting the screen so as to face the screen; a second electrode section which is provided at a second position farther away from the screen than the first electrode section in the thickness direction so as to face the first electrode section and face the screen through the first electrode section; a gap section which is provided between the first electrode section and the second electrode section and is deformable in the thickness direction when the screen is pressed; and a circuit section which is connected to the first electrode section and the second electrode section, displays to the screen, and detects a press onto the screen,
a capacitance value of a first capacitance between the first electrode section and the second electrode section is changeable due to deformation of the gap section,
the display section has a plurality of pixels to be arranged in a matrix, and each of the pixels includes a pixel electrode,
the first electrode has a plurality of first electrodes, and the first electrodes are arranged in a matrix on a plane at the first position,
the first electrodes are arranged side by side in a first direction parallel to the screen and a second direction intersecting the first direction, and each of the first electrodes is provided opposite the pixel electrodes and a distance of a gap between two adjacent first electrodes of the first electrodes is not more than a width of each of the pixels or a distance of an arrangement pitch of each of the pixel electrodes, and
steps for controlling the first electrode section and the second electrode section by the circuit section includes:
a first step in which the circuit section applies a sensor driving signal to the second electrode section, and detects a sensor detection signal based on the sensor driving signal through the first capacitance; and a second step in which the circuit section applies a touch driving signal to the first electrode section, detects a change of a second capacitance between the first electrode section and an external object touching the screen, calculates presence or absence of the touch and coordinates of a touch position corresponding to a state of the touch based on the change of the second capacitance, and outputs a touch sensing signal including the presence or absence of the touch and the coordinates of the touch position.

18. The display method according to claim 17,
wherein the circuit section calculates a pressing force corresponding to a state of the press onto the screen based on the change of the first capacitance and outputs a force sensing signal including the pressing force in the first step.

19. The display method according to claim 17,
wherein a display period in which display is performed on the screen is provided, a sensing period in which the touch is sensed as the second step and the display period are alternately provided in the touch period, and a sensing period in which the press is sensed as the first step and the display period are alternately provided in the force period.

* * * * *